United States Patent
Minakuchi et al.

(10) Patent No.: US 10,182,012 B2
(45) Date of Patent: Jan. 15, 2019

(54) ROUTE CONTROL DEVICE, SYSTEM AND ROUTE CONTROL METHOD

(71) Applicant: FUJITSU LIMITED, Kawasaki-shi, Kanagawa (JP)

(72) Inventors: Yu Minakuchi, Yokohama (JP); Hideyuki Matsuda, Kanagawa (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/978,509

(22) Filed: Dec. 22, 2015

(65) Prior Publication Data

US 2016/0248677 A1    Aug. 25, 2016

(30) Foreign Application Priority Data

Feb. 24, 2015  (JP) .................. 2015-034116

(51) Int. Cl.
| | | |
|---|---|---|
| *H04L 12/803* | (2013.01) | |
| *H04L 12/701* | (2013.01) | |
| *H04L 12/721* | (2013.01) | |
| *H04L 29/06* | (2006.01) | |

(52) U.S. Cl.
CPC ............ *H04L 47/122* (2013.01); *H04L 45/00* (2013.01); *H04L 45/123* (2013.01); *H04L 45/70* (2013.01); *H04L 65/1069* (2013.01); *H04L 65/4084* (2013.01)

(58) Field of Classification Search
CPC ......... H04L 47/70; H04L 47/72; H04L 47/74; H04L 47/78; H04L 47/80; H04L 47/18; H04L 41/0668; H04L 45/22; H04L 45/28; H04B 10/032; H04J 14/0287;
(Continued)

(56) References Cited

U.S. PATENT DOCUMENTS

| | | |
|---|---|---|
| 5,940,372 A | 8/1999 | Bertin et al. |
| 6,763,392 B1 | 7/2004 | Del et al. |

(Continued)

FOREIGN PATENT DOCUMENTS

| | | |
|---|---|---|
| JP | 09-036893 | 2/1997 |
| JP | 2002-152274 | 5/2002 |

(Continued)

OTHER PUBLICATIONS

JPOA—Japanese Office Action dated Oct. 9, 2018 for corresponding Japanese patent application No. 2015-034116, with machine translation of the Office Action.

Primary Examiner — Dady Chery
(74) Attorney, Agent, or Firm — Fujitsu Patent Center

(57) ABSTRACT

A route control device controls a transfer destination in a plurality of transfer devices that are included in a network and that transfer packets flowing between a first information processing device and a second information processing device. The route control device comprises a processor. The processor detects that a session is to be newly established, on the basis of a packet of a protocol that controls establishment of a session between the first information processing device and the second information processing device, selects a route with a light load from among a plurality of routes connecting the first information processing device and the second information processing device, and makes a transfer device on a selected route establish a selected route.

14 Claims, 38 Drawing Sheets

(58) Field of Classification Search
CPC .. H04J 14/0289; H04J 14/029; H04J 14/0291; H04J 14/0293; H04J 14/0294; H04J 14/0295
USPC .......................................... 370/230, 235, 228
See application file for complete search history.

(56) References Cited

U.S. PATENT DOCUMENTS

| | | | |
|---|---|---|---|
| 7,260,070 B1 * | 8/2007 | Smith .................... | H04W 36/18 370/328 |
| 7,467,220 B2 | 12/2008 | Del et al. | |
| 2004/0258066 A1 | 12/2004 | Chen et al. | |
| 2015/0078166 A1 * | 3/2015 | Iwata ...................... | H04L 49/50 370/235 |

FOREIGN PATENT DOCUMENTS

| | | |
|---|---|---|
| JP | 2006-135593 | 5/2006 |
| JP | 2007-503184 | 2/2007 |
| JP | 2009-232111 | 10/2009 |
| JP | 2010-200026 | 9/2010 |
| JP | 2012-044622 | 3/2012 |
| JP | 2014-127866 | 7/2014 |
| WO | 2013/133303 A1 | 9/2013 |

* cited by examiner

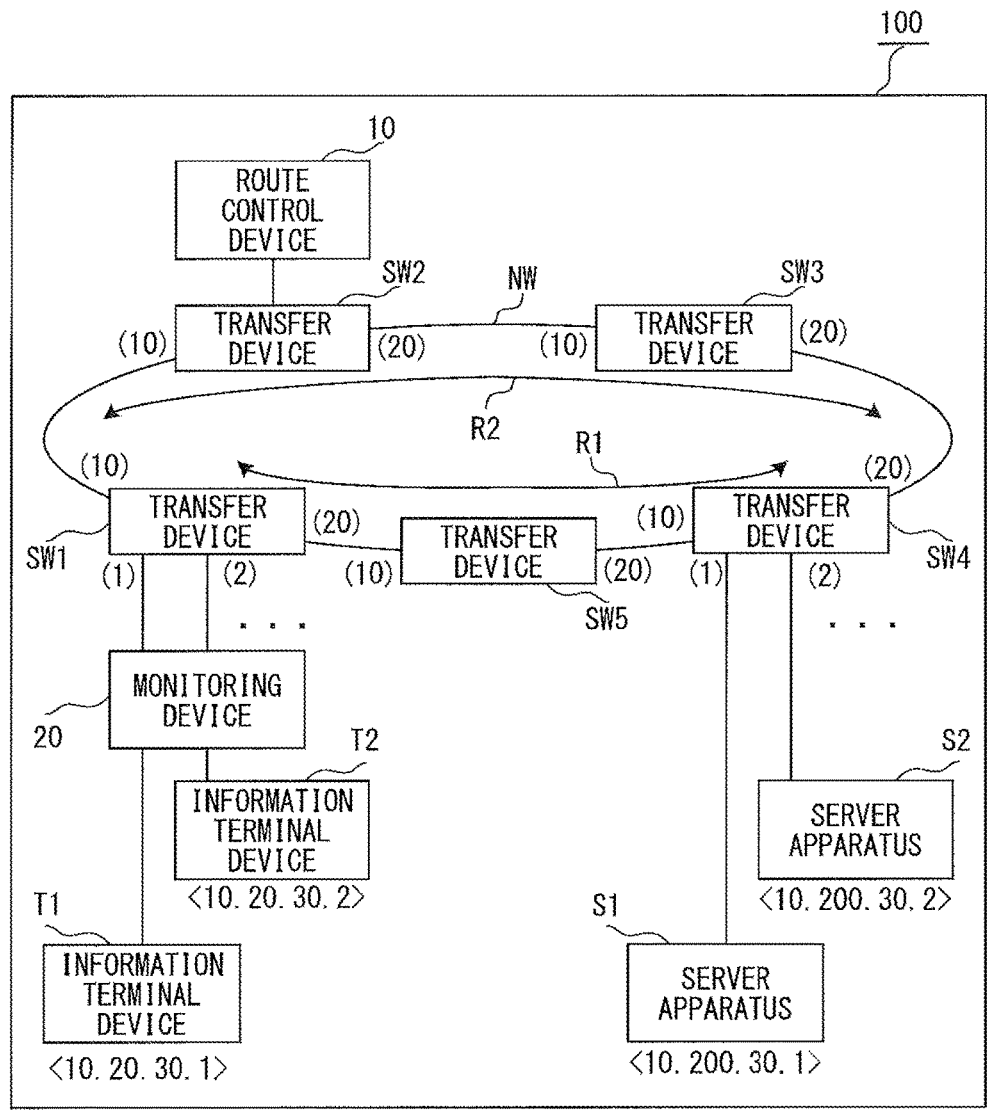
NUMBERS IN PARENTHESES: PORT NUMBERS OF CONNECTED PORTS
NUMBER STRINGS IN BRACKETS: IP ADDRESS
F I G. 1

```
          MENU OF PROGRAMS RECOMMENDED TODAY

◇DOMESTIC DRAMS        AAAAAAAA
                           aaaaaaaa
    ◇FOREIGN DRAMS         BBBBBBBB
                           bbbbbbbb
                           CCCCCCCC
    ◇SPORTS LIVE           cccccccc
                           DDDDDDDD
    ◇MOVIES                dddddddd
                                .
                                .
                                .
```

F I G. 3 rtsp://10.200.30.2/1/
PROTOCOL

FIG. 4

```
DESCRIBE rtsp://10.200.30.2/1/ RTSP/1.0
Cseq: 1
Accept: application/sdp
```

FIG. 5

```
RTSP/1.0 200 OK
Cseq: 1
Date: 01 Jan 2015 00:00:00 GMT
Content-Type: application/sdp v=0
o=-2890844256 2890842807 IN IP4 172.16.2.93
s=RTSP Session
b=10     BANDWIDTH(Mbps)
             PROTOCOL           FIRST MEDIA URI
m=audio 0 RTP/UDP 0
a=control: rtsp://10.200.30.2/1/audio
m=video 0 RTP/UDP 26        SECOND MEDIA URI
a=control: rtsp://10.200.30.2/1/video
```

F I G. 6

```
                                    FIRST MEDIA URI
TEARDOWN rtsp://10.200.30.2/1/audio RTSP/1.0
Cseq: 4
User-Agent: PhonyClient/1.2
Session: 12345678
                                    SECOND MEDIA URI
TEARDOWN rtsp://10.200.30.2/1/video RTSP/1.0
Cseq: 4
User-Agent: PhonyClient/1.2
Session: 12345678
```

FIG. 7

| INFORMATION TERMINAL DEVICE | CONNECTED TRANSFER DEVICE | CONNECTED PORT NUMBER |
|---|---|---|
| 10.20.30.1 | SW1 | 1 |
| 10.20.30.2 | SW1 | 2 |
| ⋮ | ⋮ | ⋮ |

INF1

FIG. 9

| SERVER APPARATUS | CONNECTED TRANSFER DEVICE | CONNECTED PORT NUMBER |
|---|---|---|
| 10.200.30.1 | SW4 | 1 |
| 10.200.30.2 | SW4 | 2 |
| ⋮ | ⋮ | ⋮ |

INF2

| ROUTE ID | FIRST TRANSFER DEVICE | | | SECOND TRANSFER DEVICE | | | THIRD TRANSFER DEVICE | | | FOURTH TRANSFER DEVICE | | INF3 |
|---|---|---|---|---|---|---|---|---|---|---|---|---|
| | | INPUT PORT | OUTPUT PORT | | INPUT PORT | OUTPUT PORT | | INPUT PORT | OUTPUT PORT | | INPUT PORT | OUTPUT PORT | |
| R1 | SW1 | – | 20 | SW5 | 10 | 20 | SW4 | 10 | – | – | – | ... |
| R2 | SW1 | – | 10 | SW2 | 10 | 20 | SW3 | 10 | 20 | SW4 | 20 | – | ... |
| ... | ... | ... | ... | ... | ... | ... | ... | ... | ... | ... | ... | ... |

FIG. 12

| TRANSFER DEVICE ID | USED BANDWIDTH (Mbps) | | | | | | | | | |
|---|---|---|---|---|---|---|---|---|---|---|
| | PORT 1 | | PORT 2 | | ... | PORT 10 | | ... | PORT 20 | |
| | INPUT | OUTPUT | INPUT | OUTPUT | ... | INPUT | OUTPUT | ... | INPUT | OUTPUT |
| SW1 | 1 | 10 | 1 | 1 | ... | 100 | 100 | ... | 900 | 900 |
| SW2 | 1 | 1 | 1 | 1 | ... | 100 | 100 | ... | 100 | 100 |
| SW3 | 1 | 1 | 500 | 1 | ... | 100 | 100 | ... | 100 | 100 |
| SW4 | 500 | 50 | 500 | 50 | ... | 900 | 900 | ... | 100 | 100 |
| SW5 | 1 | 1 | 1 | 1 | ... | 900 | 900 | ... | 900 | 900 |
| ... | ... | ... | ... | ... | ... | ... | ... | ... | ... | ... |

INF4

FIG. 13

| MANAGEMENT ID | INFORMATION TERMINAL DEVICE | SERVER APPARATUS | BANDWIDTH (Mbps) | PROTOCOL | ROUTE ID | NUMBER OF MEDIA | MEDIA URI | |
|---|---|---|---|---|---|---|---|---|
| | | | | | | | FIRST | SECOND |
| 1 | 10.20.30.1 | 10.200.30.1 | 15 | RTP/UDP | R1 | 2 | 10.200.30.1 /1/audio | 10.200.30.1 /1/video |
| 2 | 10.20.30.2 | 10.200.30.2 | 10 | RTP/UDP | R2 | 2 | 10.200.30.2 /1/audio | 10.200.30.2 /1/video |
| ... | ... | ... | ... | ... | ... | ... | ... | ... |

INF5

| PROTOCOL | PORT NUMBER |
|---|---|
| RTSP | 554 |
| SIP | 5060 |
| ⋮ | ⋮ |

INF6

F I G. 1 5

| OUTPUT PORT IDENTIFICATION INFORMATION | | | | OUTPUT PORT NUMBER |
|---|---|---|---|---|
| TRANSMISSION SOURCE IP ADDRESS | INPUT PORT NUMBER | TRANSMISSION DESTINATION IP ADDRESS | PROTOCOL | |
| 10.200.30.1 | 20 | 10.20.30.1 | UDP | 1 |
| 10.20.30.1 | 1 | 10.200.30.1 | UDP | 20 |
| ⋮ | ⋮ | ⋮ | ⋮ | ⋮ |

INF7

| MANAGEMENT ID | OUTPUT PORT IDENTIFICATION INFORMATION | | | | | OUTPUT PORT NUMBER |
|---|---|---|---|---|---|---|
| | TRANSMISSION SOURCE IP ADDRESS | INPUT PORT NUMBER | TRANSMISSION DESTINATION IP ADDRESS | PROTOCOL | | |
| 1 | 10.200.30.1 | 20 | 10.20.30.1 | UDP | | 1 |
| 1 | 10.20.30.1 | 1 | 10.200.30.1 | UDP | | 20 |
| ... | ... | ... | ... | ... | | ... |

INF7

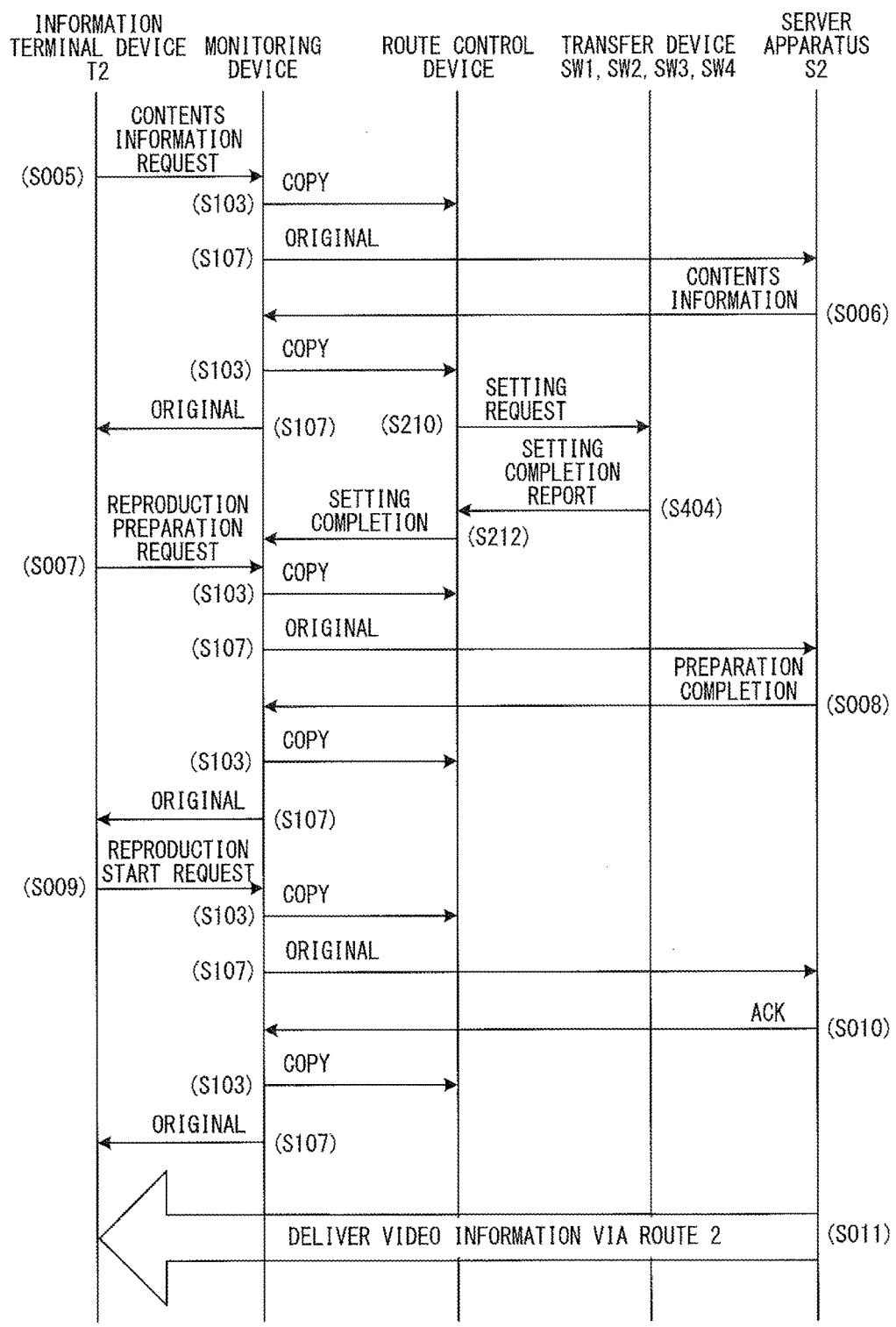
F I G. 2 5

F I G. 2 6 A INF7

| OUTPUT PORT IDENTIFICATION INFORMATION | | | | OUTPUT PORT NUMBER |
|---|---|---|---|---|
| TRANSMISSION SOURCE IP ADDRESS | INPUT PORT NUMBER | TRANSMISSION DESTINATION IP ADDRESS | PROTOCOL | |
| 10.200.30.1 | 20 | 10.20.30.1 | UDP | 1 |
| 10.20.30.1 | 1 | 10.200.30.1 | UDP | 20 |
| 10.200.30.2 | 10 | 10.20.30.2 | UDP | 2 |
| 10.20.30.2 | 2 | 10.200.30.2 | UDP | 10 |
| ⋮ | ⋮ | ⋮ | ⋮ | ⋮ |

F I G. 2 6 B INF7

| OUTPUT PORT IDENTIFICATION INFORMATION | | | | OUTPUT PORT NUMBER |
|---|---|---|---|---|
| TRANSMISSION SOURCE IP ADDRESS | INPUT PORT NUMBER | TRANSMISSION DESTINATION IP ADDRESS | PROTOCOL | |
| 10.200.30.2 | 20 | 10.20.30.2 | UDP | 10 |
| 10.20.30.2 | 10 | 10.200.30.2 | UDP | 20 |
| ⋮ | ⋮ | ⋮ | ⋮ | ⋮ |

FIG. 27A INF7

| OUTPUT PORT IDENTIFICATION INFORMATION | | | | OUTPUT PORT NUMBER |
|---|---|---|---|---|
| TRANSMISSION SOURCE IP ADDRESS | INPUT PORT NUMBER | TRANSMISSION DESTINATION IP ADDRESS | PROTOCOL | |
| 10.200.30.2 | 20 | 10.20.30.2 | UDP | 10 |
| 10.20.30.2 | 10 | 10.200.30.2 | UDP | 20 |
| ⋮ | ⋮ | ⋮ | ⋮ | ⋮ |

FIG. 27B INF7

| OUTPUT PORT IDENTIFICATION INFORMATION | | | | OUTPUT PORT NUMBER |
|---|---|---|---|---|
| TRANSMISSION SOURCE IP ADDRESS | INPUT PORT NUMBER | TRANSMISSION DESTINATION IP ADDRESS | PROTOCOL | |
| 10.200.30.1 | 1 | 10.20.30.1 | UDP | 10 |
| 10.20.30.1 | 10 | 10.200.30.1 | UDP | 1 |
| 10.200.30.2 | 2 | 10.20.30.2 | UDP | 20 |
| 10.20.30.2 | 20 | 10.200.30.2 | UDP | 2 |
| ⋮ | ⋮ | ⋮ | ⋮ | ⋮ |

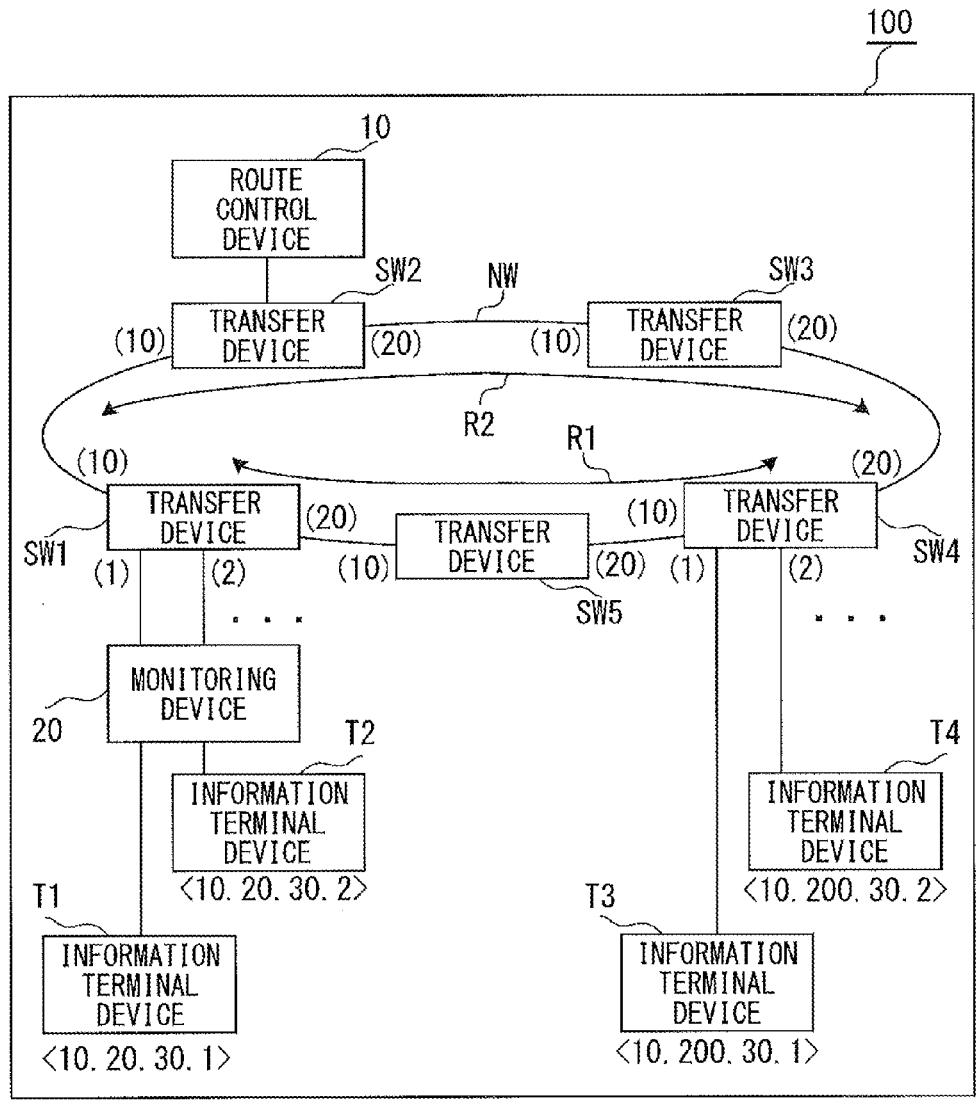
NUMBERS IN PARENTHESES: PORT NUMBERS OF CONNECTED PORTS
NUMBER STRINGS IN BRACKETS: IP ADDRESS
F I G. 2 8

```
INVITE sip:T4@10.200.30.2 SIP/2.0
From:T1 ;tag=9fxced76sl To:T4
Call-ID: 1234567890@example.com    ← Call-ID
Cseq: 1 INVITE
Content-Type: application/sdp
Content-Length: 345 v=0      BANDWIDTH(Mbps)
b=10
o=A 2890844526 2890844526 IN IP4 10.200.30.2
m=audio 6716 RTP/UDP 0
a=rtpmap:0 PCMU/8000    PROTOCOL
m=video 6712 RTP/UDP 98
a=rtpmap:0 PCMU/8000
```

FIG. 30

```
BYE sip:T4@10.200.30.2 SIP/2.0
From:T1 ;tag=8321234356 To:T4 ;tag=9fxced76sl
Call-ID: 1234567890@example.com
Cseq: 1 BYE
```

Call-ID

F I G. 3 1

| INFORMATION TERMINAL DEVICE | CONNECTED TRANSFER DEVICE | CONNECTED PORT NUMBER |
|---|---|---|
| 10.20.30.1 | SW1 | 1 |
| 10.20.30.2 | SW1 | 2 |
| ⋮ | ⋮ | ⋮ |
| 10.200.30.1 | SW4 | 1 |
| 10.200.30.2 | SW4 | 2 |
| ⋮ | ⋮ | ⋮ |

INF1

FIG. 32

| MANAGEMENT ID | FIRST INFORMATION TERMINAL DEVICE | SECOND INFORMATION TERMINAL DEVICE | BANDWIDTH (Mbps) | PROTOCOL | ROUTE ID | CALL-ID |
|---|---|---|---|---|---|---|
| 1 | 10.20.30.1 | 10.200.30.1 | 15 | RTP/UDP | R1 | 9876543210@example.com |
| 2 | 10.20.30.2 | 10.200.30.2 | 10 | RTP/UDP | R2 | 1234567890@example.com |
| ... | ... | ... | ... | ... | ... | ... |

INF5

FIG. 33

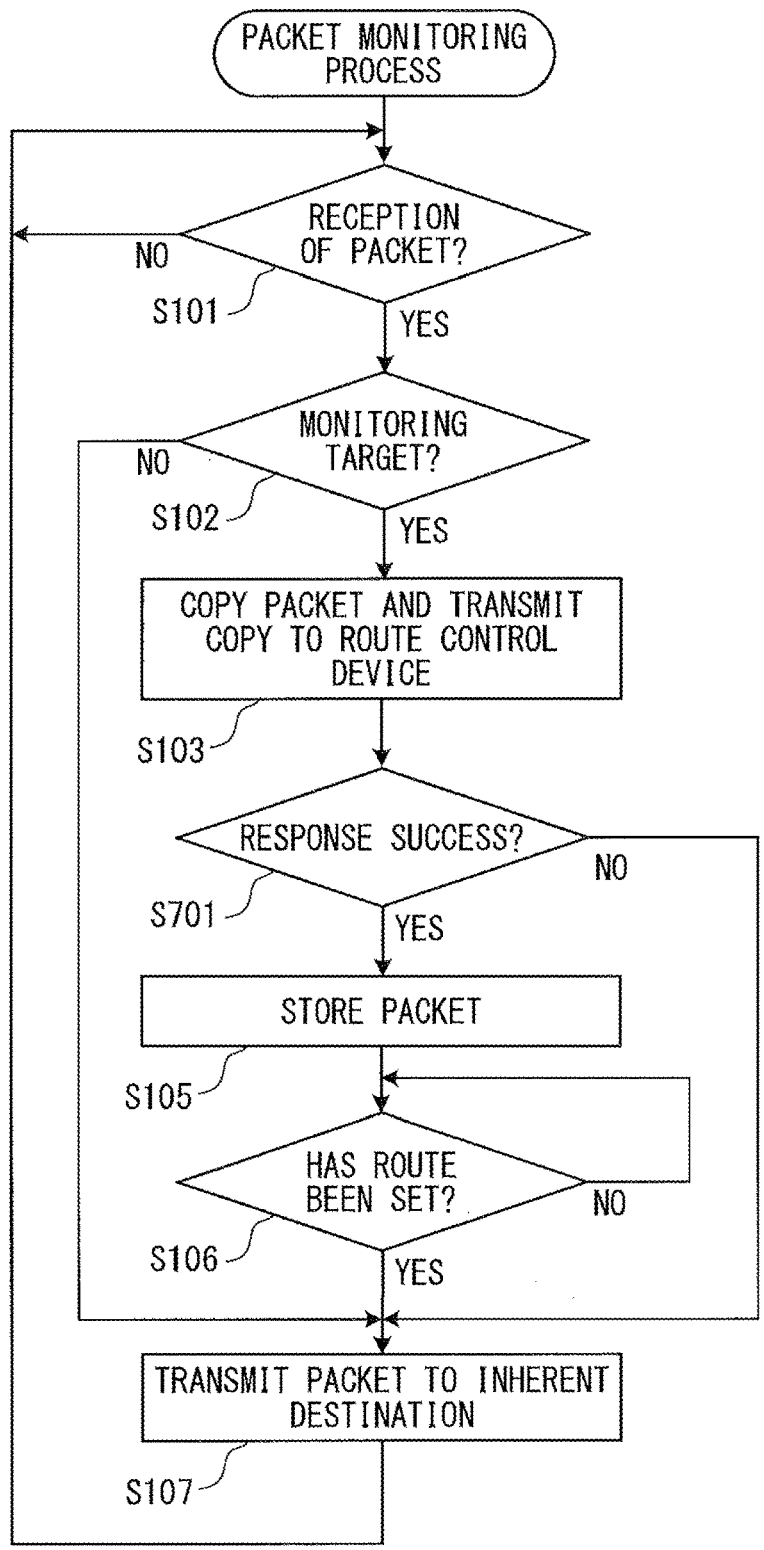
F I G. 34

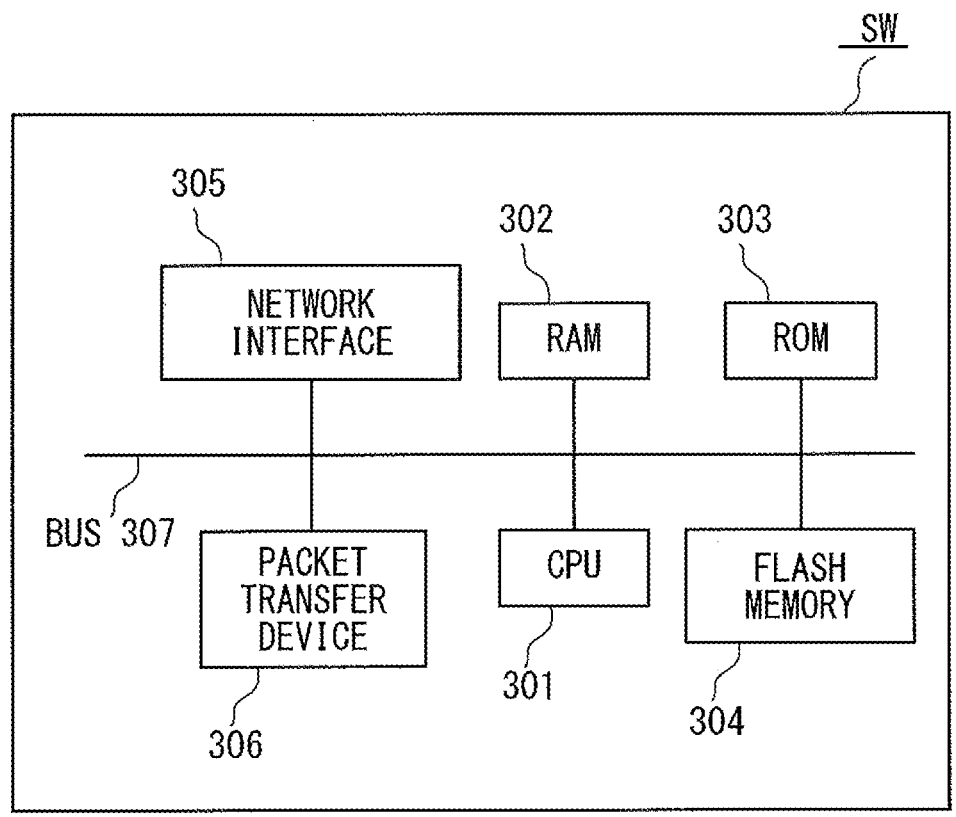
F I G. 38

ROUTE CONTROL DEVICE, SYSTEM AND ROUTE CONTROL METHOD

CROSS-REFERENCE TO RELATED APPLICATION

This application is based upon and claims the benefit of priority of the prior Japanese Patent Application No. 2015-034116, filed on Feb. 24, 2015, the entire contents of which are incorporated herein by reference.

FIELD

The embodiments discussed herein are related to a route control device, a system and a route control method.

BACKGROUND

Recently, technology of communicating audio information, video information, etc. on an Internet Protocol (IP) network in a real time manner such as for example video delivery, videotelephony, etc. has been spreading.

When audio information, video information, etc. are communicated in a real time manner, a large bandwidth is used continuously. This has caused a problem in which a plurality of sessions concentrate, leading to network congestion. When a plurality of communication routes (referred to as "routes" hereinafter) exist, a route with a fewer hops is usually selected regardless of congestion states of routes in IP networks. This may lead to a case where the quality of a session such as video delivery that has already been established deteriorates due to network congestion caused by a session established later.

As a method for solving this problem, a method in which a needed bandwidth is secured before the start of a session by utilizing Resource reservation Protocol (RSVP) is known.

However, when for example RSVP is utilized in video delivery, it is needed that the server apparatus that delivers videos and an information terminal device that reproduces the videos recognize the route. Also, a long period of time is taken to secure a bandwidth used for executing the session, leading to delay in starting the reproduction.

[Patent Document 1] Japanese Laid-open Patent Publication No. 2002-152274

[Patent Document 2] Japanese Laid-open Patent Publication No. 2010-200026

[Patent Document 3] Japanese Laid-open Patent Publication No. 2012-44622

SUMMARY

According to an aspect of the embodiments, a route control device configured to control a transfer destination in a plurality of transfer devices that are included in a network and that transfer packets flowing between a first information processing device and a second information processing device, the route control device including a processor is provided. The processor detects that a session is to be newly established, on the basis of a packet of a protocol that controls establishment of a session between the first information processing device and the second information processing device, selects a route with a light load from among a plurality of routes connecting the first information processing device and the second information processing device, and makes a transfer device on a selected route establish a selected route.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration example of a network system in embodiment 1;

FIG. 3 illustrates an example of a menu display window;

FIG. 4 illustrates an example of a metafile;

FIG. 5 illustrates an example of a contents information request (DESCRIBE);

FIG. 6 illustrates an example of contents information;

FIG. 7 illustrates an example of a reproduction halt request (TEARDOWN);

FIG. 9 illustrates an example of first connection information in embodiment 1;

FIG. 10 illustrates an example of second connection information in embodiment 1;

FIG. 11 illustrates an example of route candidate information in embodiment 1;

FIG. 12 illustrates an example of load information in embodiment 1;

FIG. 13 illustrates an example of session management information in embodiment 1;

FIG. 15 illustrates an example of monitoring target information in embodiment 1;

FIG. 17 illustrates an example of transfer management information in embodiment 1;

FIG. 18 illustrates another example of transfer management information;

FIG. 25 illustrates a specific example for explaining the flow up to the delivery of a video in the entire system in embodiment 1;

FIG. 26A illustrates an example of transfer management information of transfer device SW1 and FIG. 26B illustrates an example of transfer management information of transfer device SW2;

FIG. 27A illustrates an example of transfer management information of transfer device SW3 and FIG. 27B illustrates an example of transfer management information of transfer device SW4;

FIG. 28 illustrates a configuration example of a network system in embodiment 2;

FIG. 30 illustrates an example of call (INVITE);

FIG. 31 illustrates an example of a session disconnection request (BYE);

FIG. 32 illustrates an example of first connection information in embodiment 2;

FIG. 33 illustrates an example of session management information in embodiment 2;

FIG. 34 illustrates an example of a flowchart for explaining the flow of a packet monitoring process in embodiment 2;

FIG. 38 illustrates an example of a hardware configuration of a transfer device in each embodiment.

DESCRIPTION OF EMBODIMENTS

Figure 2:
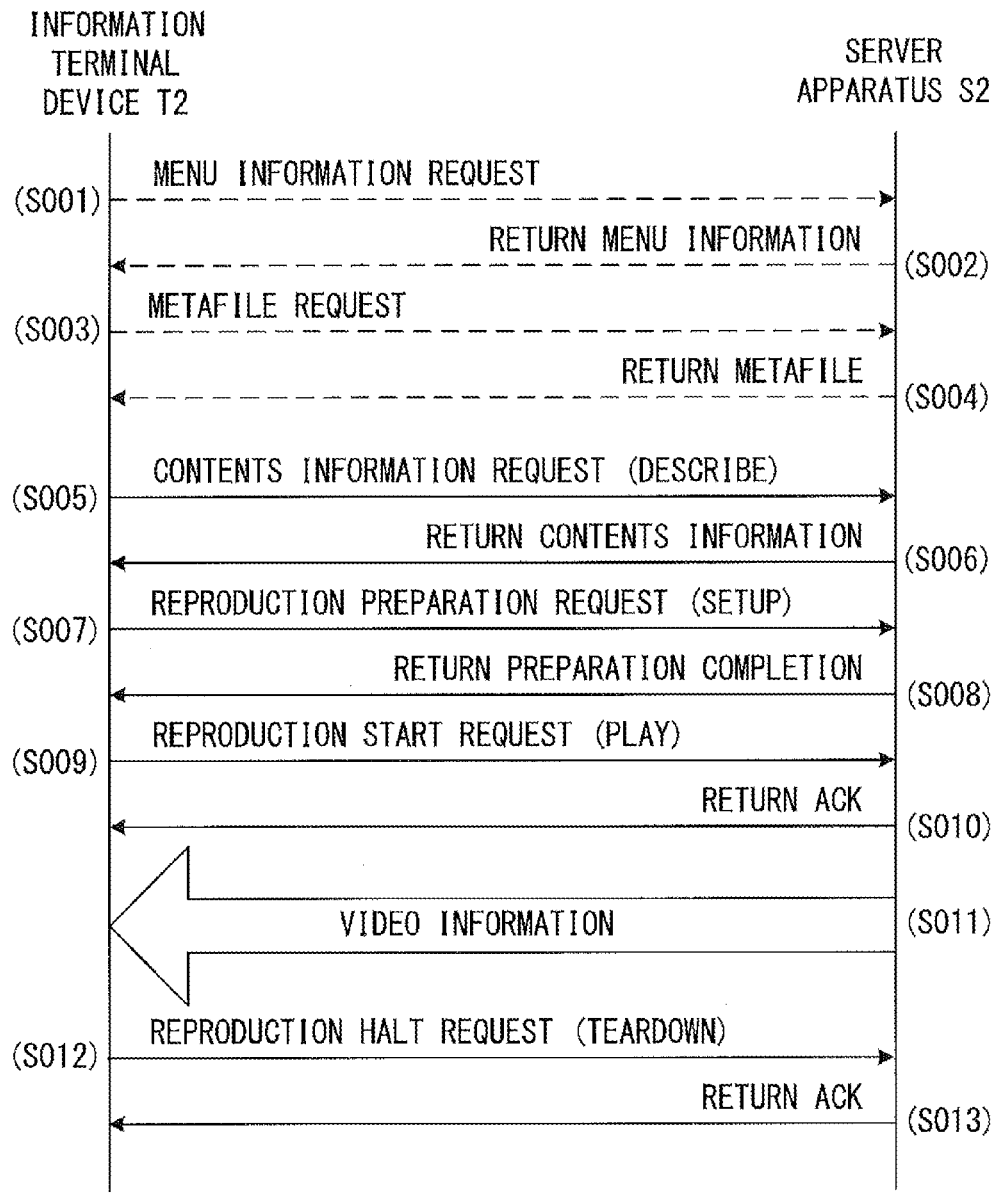
FIG. 2 illustrates an example of a sequence of a general video delivery.

The embodiments of the present invention will be explained in detail by referring to the drawings.

Embodiment 1

FIG. 1 illustrates an example of a network system 100 in embodiment 1 of the present invention. The network system 100 according to the present invention may be for example a video delivery system. The network system 100 according to the present invention includes a route control device 10, a monitoring device 20, a plurality of transfer devices SW, one or a plurality of information terminal devices T, and one or a plurality of server apparatuses S as illustrated in FIG. 1. The respective devices in the network system 100 according to the present invention are connected via network NW such as an IP network in such a manner that communications to each other are possible.

Note that the numbers in the parentheses in FIG. 1 represent port numbers of connected ports, and the number strings in the brackets represent IP addresses. Also, in the following explanations, when a particular one of transfer devices SW, information terminal devices T or server apparatuses S is referred to, a device identification number is added in such a manner that these devices are referred to as for example transfer device SW1 or transfer device SW2. Also, in the following explanations, it is assumed that the network system 100 in embodiment 1 of the present invention is a video delivery system.

In embodiment 1 according to the present invention, information terminal device T is a reproduction terminal device that reproduces a video, and server apparatus S is a video delivery server that delivers a video. FIG. 2 illustrates an example of a sequence of a general video delivery. The example illustrated in FIG. 2 is an example of a case where information terminal device T2 illustrated in FIG. 1 is a reproduction terminal device and server apparatus S2 in FIG. 1 is a video delivery server.

When for example the user has performed a prescribed manipulation for making a request for menu information of delivered videos in a web page, information terminal device T2 uses HyperText Transport Protocol (HTTP)/Transmission Control Protocol (TCP) so as to transmit a menu information request to server apparatus S2 (step S001). In response to the menu information request, server apparatus S2 utilizes HTTP/TCP so as to return, to information terminal device T2, menu information about videos that can be delivered (step S002).

Figure 4:
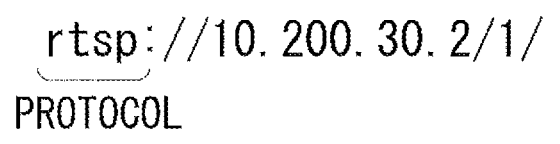

Receiving the menu information, information terminal device T2 displays the received menu information on a web page. FIG. 3 illustrates an example of a menu display window displayed on a web page. When the user has selected a video to be delivered in the displayed menu, information terminal device T2 utilizes HTTP/TCP so as to transmit, to server apparatus S2, a metafile request for making a request for the metafile of the selected video (step S003). In response to the metafile request, server apparatus S2 utilizes HTTP/TCP so as to return the metafile of the selected video to information terminal device T2 (step S004). FIG. 4 illustrates an example of a metafile.

Receiving the metafile, information terminal device T2 analyzes the received metafile. Because the protocol of the container address of the received metafile is Real Time Streaming Protocol (RTSP), information terminal device T2 uses RTSP/TCP so as to transmit, to server apparatus S2, contents information request (DESCRIBE) for making a request for contents information (step S005). FIG. 5 illustrates an example of a contents information request (DESCRIBE). In response to the contents information request (DESCRIBE), server apparatus S2 uses RTSP/TCP so as to return the specified contents information (step S006). FIG. 6 illustrates an example of contents information.

Receiving contents information, information terminal device T2 uses RTSP/TCP to transmit, to server apparatus S2, a reproduction preparation request (SETUP) for making a request for the preparation of video delivery (step S007). Receiving the reproduction preparation request (SETUP), server apparatus S2 allocates resources for the video delivery, and a session is established. When the preparation has been completed, server apparatus S2 uses RTSP/TCP so as to return preparation completion to information terminal device T2 (step S008).

Receiving preparation completion, information terminal device T2 uses RTSP/TCP so as to transmit, to server apparatus S2, a reproduction start request (PLAY) for making a request to start the delivery of the selected video (step S009). Receiving the reproduction start request (PLAY), server apparatus S2 uses RTSP/TCP so as to return ACKnowledgement (ACK) to server apparatus S2 (step S010). Also, server apparatus S2 uses Real-time Transport Protocol (RTP)/User Datagram Protocol (UDP) so as to sequentially transmit the video information for which the delivery was requested (step S011).

When the user has made a prescribed manipulation for halting the reproduction, information terminal device T2 uses RTSP/TCP so as to transmit to server apparatus S2 a reproduction halt request (TEARDOWN) for halting the delivery of the video (step S012). FIG. 7 illustrates an example of a reproduction halt request (TEARDOWN). Receiving the reproduction halt request (TEARDOWN), server apparatus S2 halts the delivery of the video for which the halt of the delivery was requested, and the session is disconnected (released). Also, server apparatus S2 uses RTSP/TCP to return ACK to information terminal device T2 (step S013).

As described above, in general video delivery, when a session based on RTSP has been established, video delivery (media data transfer) based on RTP is conducted under control of RTSP.

Figure 8:
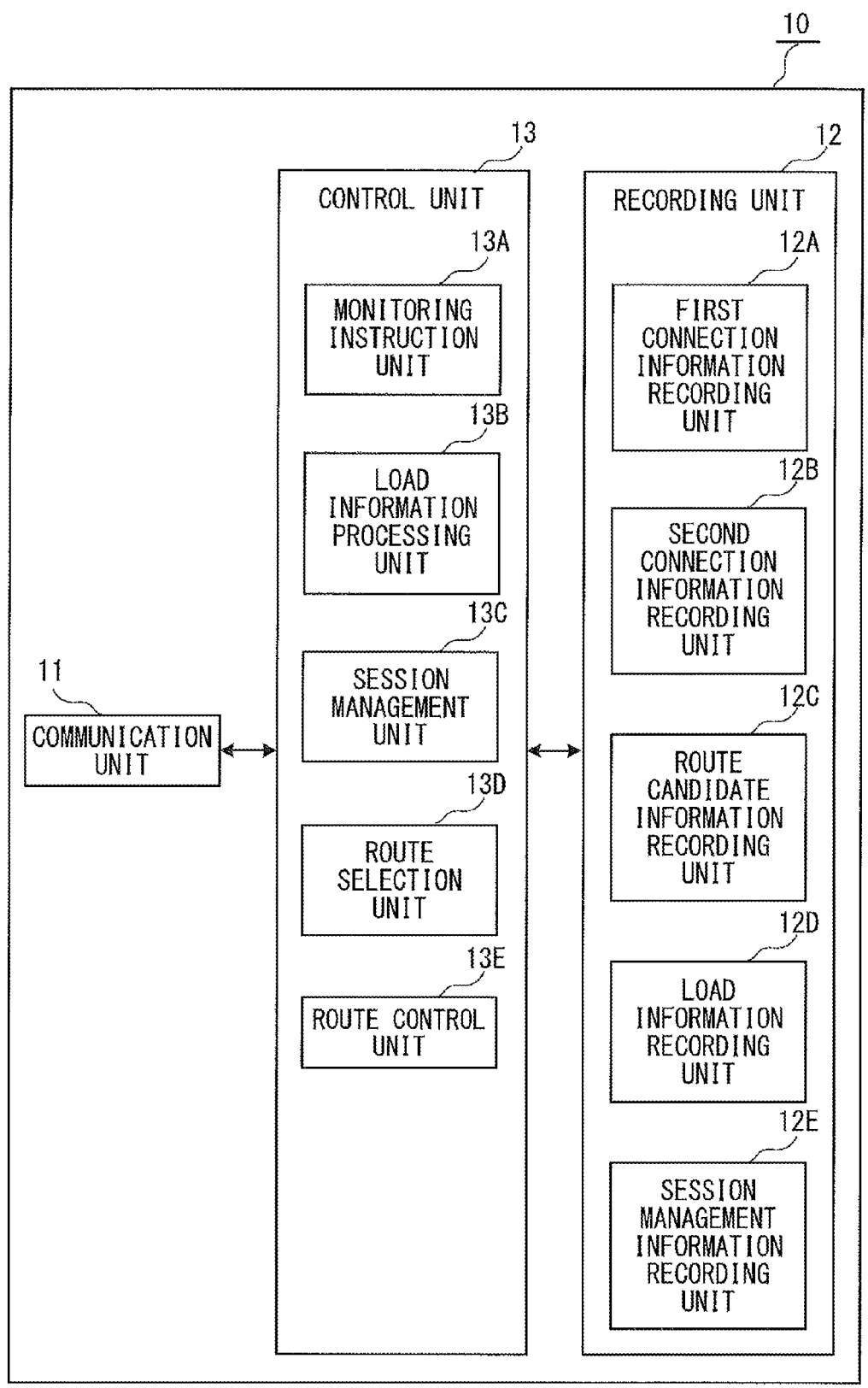
FIG. 8 is a functional block diagram illustrating a configuration example of a route control device in embodiment 1.

FIG. 8 is a functional block diagram illustrating a configuration example of the route control device 10 in embodiment 1 of the present invention. The route control device 10 in embodiment 1 of the present invention is a device that controls each transfer device SW in the network system 100, and includes a communication unit 11, a recording unit 12 and a control unit 13 as illustrated in FIG. 8.

The communication unit 11 includes for example a network interface etc. and conducts communications between for example the monitoring device 20 and each transfer device SW. For example, the communication unit 11 transmits a monitoring request (which will be explained later in detail) to the monitoring device 20 under control of a monitoring instruction unit 13A (which will be explained later in detail). Also, for example, receiving a packet transmitted from the monitoring device 20, the communication unit 11 outputs the received packet to a session management unit 13C (which will be explained later in detail). Also, for example, receiving a load information report (which will be explained later in detail) transmitted from transfer device SW, the communication unit 11 outputs the received load information report to a load information processing unit 13B (which will be explained later in detail).

Also, for example, the communication unit 11 transmits a setting request (which will be described later in detail) to corresponding transfer device SW under control of a route control unit 13E (which will be described later in detail). Also, for example, receiving a setting completion report from transfer device SW, the communication unit 11 outputs the received setting completion report to route control unit 13E. Also, for example, the communication unit 11 transmits setting completion (which will be described later in detail) to the monitoring device 20 under control of route control unit 13E. Also, for example, the communication unit 11 transmits a setting cancellation request (which will be described later in detail) to corresponding transfer device SW under control of route control unit 13E.

The recording unit 12 includes for example a Random Access Memory (RAM), a Read Only Memory (ROM), a flash memory, etc. The recording unit 12 functions as for example the work area for a Central Processing Unit (CPU), the program area that stores various types of programs such as the operation program for conducting the entire control of the route control device 10, and the data area that stores various types of data, all these areas being included in the control unit 13.

Also, as illustrated in FIG. 8, the recording unit 12 functions as a first connection information recording unit 12A, a second connection information recording unit 12B, a route candidate information recording unit 12C, a load information recording unit 12D and a session management information recording unit 12E.

The first connection information recording unit 12A is a recording unit that records first connection information INF1. FIG. 9 illustrates an example of first connection information INF1 in embodiment 1 of the present invention. First connection information INF1 exemplified in FIG. 9 is a table in which the IP address of information terminal device T, the device identification number of transfer device SW to which that information terminal device T is connected (connected transfer device), and the port number of the port to which that information terminal device T is connected (connected port number) are associated. The route control device 10 holds first connection information INF1 as described above, and thereby identifies connected transfer device SW, to which information terminal device T having established a session is connected.

The second connection information recording unit 12B is a recording unit that records second connection information INF2. FIG. 10 illustrates an example of second connection information INF2 in embodiment 1 of the present invention. Second connection information INF2 exemplified in FIG. 10 is a table in which the IP address of server apparatus S, the device identification number of transfer device SW to which that server apparatus S is connected (connected transfer device), and the port number of the port to which that server apparatus S is connected (connected port number) are associated. The route control device 10 holds second connection information INF2 as described above, and thereby identifies transfer device SW to which server apparatus S having established a session is connected.

The route candidate information recording unit 12C is a recording unit that records route candidate information INF3. FIG. 11 illustrates an example of route candidate information INF3 in embodiment 1 of the present invention. Route candidate information INF3 exemplified in FIG. 11 is a table that stores a list of routes connecting information terminal device T and server apparatus S. A route is defined by transfer devices SW through which a packet passes when that packet is transmitted from information terminal device T to server apparatus S. For example, as illustrated in FIG. 1, first route R1 that passes through transfer device SW1, transfer device SW5 and transfer device SW4 in this order and second route R2 that passes through transfer device SW1, transfer device SW2, transfer device SW3 and transfer device SW4 in this order exist as routes that connect information terminal device T1 and server apparatus S1. Also, as illustrated in FIG. 11, for each transfer device SW on the routes, the port number of the input port to which a packet is input when the packet passes through the corresponding route and the port number of the output port through which the packet is output when the packet is transferred to the next transfer destination are associated. The route control device 10 holds route candidate information INF3 as described above, and thereby selects a route appropriate for transmitting video information (media data).

The load information recording unit 12D is a recording unit that records load information INF4, and load information INF4 is managed by the load information processing unit 13B. FIG. 12 illustrates an example of load information INF4 in embodiment 1 of the present invention. Load information INF4 exemplified in FIG. 12 is a table that manages the load on each port for each transfer device SW. The load on each port included in a load information report transmitted from each transfer device SW is stored in the corresponding section by the load information processing unit 13B. The route control device 10 holds load information INF4 as described above, and thereby can select a route with a lighter load.

The session management information recording unit 12E is a recording unit that records session management information INF5, and session management information INF5 is managed by the session management unit 13C. FIG. 13 illustrates an example of session management information INF5 in embodiment 1 of the present invention. Session management information INF5 exemplified by FIG. 13 is a table in which information on a session being established is associated with each session. The route control device 10 holds session management information INF5 as described above, and thereby manages a session being established.

As illustrated in FIG. 13, information on a session in embodiment 1 of the present invention includes the IP address of information terminal device T, the IP address of server apparatus S, the protocol, the route ID and the media Uniform Resource Identifier (URI). Also, as illustrated in FIG. 13, information on a session may include a bandwidth (Mbps), the number of media, etc.

A management ID is an identifier for uniquely identifying a session, and is assigned by the session management unit 13C when a new session has been established.

The IP address of information terminal device T is the IP address of information terminal device T of the corresponding session, and the IP address of sever apparatus S is the IP address of server apparatus S of the corresponding session. These IP addresses are the transmission source IP address (IP address of information terminal device T) and the transmission destination IP address (IP address of server apparatus S) included in the packet header of contents information request (DESCRIBE), and are stored by the session management unit 13C.

A protocol is the protocol used in the corresponding session. In embodiment 1 of the present invention, the protocol used for delivering video information (media data) included in contents information (exemplified in FIG. 6) returned from server apparatus S is stored by the session management unit 13C in response to a contents information request (DESCRIBE).

A route ID is identification information that can uniquely identify a route, and the route ID of a route selected by a route selection unit 13D is stored.

A media URI is the URI of a medium delivered in the corresponding session. In response to a contents information request (DESCRIBE), the URIs of media included in contents information (exemplified in FIG. 6) returned from server apparatus S are stored respectively. The number of media is the number of media delivered in the corresponding session, and is stored by the session management unit 13C. A bandwidth (Mbps) is a bandwidth used for a corresponding session, and the bandwidth included in contents information (exemplified in FIG. 6) is stored by the session management unit 13C.

Explanations return to FIG. 8, where the control unit 13 includes for example a CPU etc. and executes the operation program stored in the program area of the recording unit 12 so as to realize the functions as the monitoring instruction unit 13A, the load information processing unit 13B, the session management unit 13C, the route selection unit 13D and the route control unit 13E. Also, the control unit 13 executes the operation program so as to perform the control process that controls the route control device 10 entirely and a route control process, which will be described later in detail.

The monitoring instruction unit 13A generates a monitoring request including a list of monitoring targets that specify a packet whose copy is to be transmitted, and transmits the generated monitoring request to the monitoring device 20. A monitoring target is set by for example the administrator, and a packet whose copy is to be transmitted is specified by for example a pair of a protocol and a port number.

When a load information report transmitted from each transfer device SW has been input, the load information processing unit 13B associates information representing the load on each port included in the load information report with the transfer device ID of transfer device SW that transmitted that load information report and stores them in load information INF4. For this storing, when the load information of transfer device SW that transmitted the input load information report has already been stored, the update is performed by using the information representing the load on each port included in the input load information report. In this example, information representing the load on a port is for example a used bandwidth (Mbps).

On the basis of a packet of the protocol that controls a session that is to be established, i.e., a packet that is a monitoring target for the monitoring device 20, the session management unit 13C manages a session that is being established. In embodiment 1 of the present invention, the session management unit 13C manages a session that is being established on the basis of a packet based on RTSP.

More specifically, when a packet transmitted from the monitoring device 20 has been received and the received packet is a contents information request (DESCRIBE), the session management unit 13C adds an entry to session management information INF5, and stores, in the "management ID" section of the added entry, the management ID assigned to a session that is to be newly established. Then, the session management unit 13C stores the transmission source IP address and the transmission destination IP address included in the packet header of the contents information request (DESCRIBE), in the "IP address of information terminal device T" section and the "IP address of server apparatus S" section of the added entry, respectively.

Also, when the received packet is contents information, the session management unit 13C stores, in the corresponding sections of the corresponding entry in session management information INF5, the media URI, the protocol and the bandwidth (Mbps) included in the contents information. For this storing, the session management unit 13C counts the number of media URIs, and stores the number of the media URIs in the "number of media" section of the corresponding entry in session management information INF5. Then, the session management unit 13C reports for example the management ID to the route selection unit 13D so as to instruct the route selection unit 13D to select a route for transmitting video information that is to be delivered in the session that is to be newly established.

Also, when the received packet is a reproduction halt request (TEARDOWN), the session management unit 13C identifies an corresponding entry in session management information INF5 on the basis of the transmission source IP address and the transmission destination IP address in the packet header of the reproduction halt request (TEARDOWN) and the media URI included in the reproduction halt request (TEARDOWN). Then, the session management unit 13C reports the management ID of the identified entry to the route control unit 13E, and instructs the route control unit 13E to transmit a setting cancellation request to each transfer device SW on the router specified by the route ID of the identified entry. Then, the session management unit 13C deletes the identified entry after the route control unit 13E transmitted setting cancellation.

As described above, on the basis of a packet of the protocol that controls a session transmitted prior to the establishment of the session, the session management unit 13C detects that the session is to be newly established. Detecting that the session is to be newly established, the session management unit 13C assigns a management ID to that session, and registers information on that session in session management information INF5 so that session management information INF5 holds the information. Then, on the basis of a packet that controls the disconnection of the session, the session management unit 13C deletes information on the session that has been held. Thereby, the session management unit 13C manages a session that is being established, on the basis of a packet of the protocol that controls a session that is to be established.

Instructed to select a route, the route selection unit 13D selects a route with a light load from among route candidates. More specifically, the route selection unit 13D identifies an entry in session management information INF5 on the basis of the reported management ID, and refers to first connection information INF1 so as to identify transfer device SW that accommodates information terminal device T of the identified entry. In other words, the route selection unit 13D identifies transfer device SW that accommodates information terminal device T of the session that is to be newly established. Also, the route selection unit 13D refers to second connection information INF2 so as to identify transfer device SW that accommodates server apparatus s of the identified entry. In other words, the route selection unit 13D identifies transfer device SW that accommodates server apparatus S of the session that is to be newly established.

Then, the route selection unit 13D refers to route candidate information INF3 so as to identify route candidates that connect information terminal device T and server apparatus S of the session that is to be newly established, on the basis of transfer device SW identified as a device that accommodates information terminal device T and transfer device SW identified as a device that accommodates server apparatus S.

Then, the route selection unit 13D selects a route from among the identified route candidates. More specifically, the route selection unit 13D refers to route candidate information INF3 so as to identify the port number of the input/output port of each transfer device SW that a packet is input to and output from when the packet passes through the identified route candidate. Then, the route selection unit 13D calculates, for each route candidate, the minimum value of a difference between the maximum bandwidth (Mbps) of the identified port and the used bandwidth (Mbps) of the specified input/output direction (direction in which a packet is input or output) of the corresponding port, and selects, as the route, the route candidate for which the highest value has been calculated. In other words, the route selection unit 13D selects a route with alight load on a port when transfer device SW on the route conducts transfer. For this selection, when there are a plurality of route candidates with the greatest calculated minimum value, the route selection unit 13D selects the route with the smallest hop count from among the route candidates with the greatest calculated minimum value.

Then, the route selection unit 13D stores the route ID of the selected route in the "route ID" section of the corresponding entry in session management information INF5, and reports for example the management ID to the route control unit 13E so as to instruct the route control unit 13E to transmit a setting request.

When for example first route R1 is used in FIG. 1, a packet transmitted from information terminal device T to server apparatus S is output from port 20 of transfer device SW1, is input to port 10 of transfer device SW5, is output from port 20 of transfer device SW5, and is input to port 10 of transfer device SW4. A packet transmitted from server apparatus S to information terminal device T is output from port 10 of transfer device SW4, is input to port 20 of transfer device SW5, is output from port 10 of transfer device SW5, and is input to port 20 of transfer device SW1. In such a case, in the example of load information INF4 illustrated in FIG. 12, each of the used bandwidths in the direction in which the packet is input or output through the ports of transfer devices SW on first route R1 is 900 Mbps.

When second route R2 is used, a packet transmitted from information terminal device T to server apparatus S is output from port 10 of transfer device SW1, is input to port 10 of transfer device SW2, is output from port 20 of transfer device SW2, is input to port 10 of transfer device SW3, is output from port 20 of transfer device SW3, and is input to port 20 of transfer device SW4. A packet transmitted from server apparatus S to information terminal device T is output from port 20 of transfer device SW4, is input to port 20 of transfer device SW3, is output from port 10 of transfer device SW3, is input to port 20 of transfer device SW2, is output from port 10 of transfer device SW2, and is input to port 10 of transfer device SW1. In such a case, in the example of load information INF4 illustrated in FIG. 12, each of the used bandwidths in the direction in which the packet is input or output through the ports of transfer devices SW on second route R2 is 100 Mbps.

In this example, when the maximum bandwidth of each of the respective ports is 1000 Mbps, the minimum value of a difference between the maximum bandwidth of each port on first route R1 and the used bandwidth in the direction in which a packet is input or output through that port is 100 Mbps. The minimum value of a difference between the maximum bandwidth of each port on second route R2 and the used bandwidth in the direction in which a packet is input or output through that port is 900 Mbps. Accordingly, in this example, the route selection unit 13D selects second route R2. Note that a route with a small hop count may be selected from among routes for which the bandwidth (Mbps) of a session that is to be established is equal to or smaller than the minimum value of the difference.

Explanations return to FIG. 8, where the route control unit 13E controls a route for transferring a packet that is to be transmitted in an established session. More specifically, instructed to transmit a setting request, the route control unit 13E generates setting requests respectively for transfer devices SW on the selected route. Thereafter, the route control unit 13E transmits the generated setting requests respectively to corresponding transfer devices SW. When transfer completion reports have been received from all transfer devices SW to which the setting requests were transmitted, the route control unit 13E transmits, to the monitoring device 20, setting completion, which indicates that setting of the transfer destination in transfer devices SW on the route has been completed.

A setting request reports, to transfer devices SW on a selected route, the transfer destination of a packet that is transmitted in a session that is to be established, and includes a pair of output port identification information and an output port number. There are two pairs of output port identification information and output port numbers included in a setting request; one is for a packet in the upstream direction (packets transmitted from information terminal device T to server apparatus S) and the other is for a packet in the downstream direction (packets transmitted from server apparatus S to information terminal device T). Output port identification information is information representing a condition for outputting a packet from the port with the corresponding port number, and is for example a combination of a transmission source IP address, a transmission destination IP address, an input port number and a protocol. Note that because video information (media data) is transmitted only in the direction from server apparatus S, which delivers video information (media data), to information terminal device T, which reproduces the information, in a session based on RTSP, it is possible to include, in a setting request, only a pair for a packet in the downward direction.

As a transmission source IP address, the IP address of information terminal device T or server apparatus S of the corresponding entry in session management information INF5 is set. That is, the transmission source IP address is the IP address of information terminal device T or server apparatus S of a session that is to be established. For a packet in the upstream direction, the transmission source IP address is the IP address of information terminal device T, and for a packet in the downstream direction, the transmission source IP address is the IP address of the server apparatus S.

Similarly, as a transmission destination IP address, the IP address of information terminal device T or server apparatus S of the corresponding entry in session management information INF5 is set. In other words, the transmission destination IP address is the IP address of information terminal device T or server apparatus S of a session that is to be established. For a packet in the upstream direction, the transmission source IP address is the IP address of server apparatus S, and for a packet in the downstream direction, the transmission destination IP address is the IP address of information terminal device T.

As an input port number, the input port number of transfer device SW that transmits a setting request on the route selected in route candidate information INF3 is set. In other words, an input port number is the port number of a port to which a packet is input in transfer device SW that transmits a setting request, when the selected route is used. Note that route candidate information INF3 exemplified in FIG. 11 is an example of a packet in the upstream direction, and for a packet in the downstream direction, an input port number is the output port number of transfer device SW that transmits a setting request on the route selected in route candidate information INF3. Also, as an input port number for a setting request for transfer device SW through which a transmitted packet first passes, the corresponding connected port number in first connection information INF1 (or second connection information INF2) is set. In other words, for a packet in the upstream direction, the corresponding connected port number in first connection information INF1 is set as the input port number, and for a packet in the downstream direction, the corresponding connected port number in second connection information INF2 is set as the input port number.

For example, in FIG. 9 and FIG. 11, the selected route is second route R2 and the input port number for a packet in the upstream direction is "1" and the input port number for a packet in the downward direction is "10" in the setting request for transfer device SW1.

As a protocol, the protocol of the corresponding entry in session management information INF5 is stored.

As an output port number, the output port number of transfer device SW that transmits a setting request on the route selected in route candidate information INF3 is set. In other words, an output port number is the port number of a port from which a packet is output, when the selected route is used, in transfer device SW that transmits a setting request. Note that route candidate information INF3 exemplified in FIG. 11 is an example of a packet in the upstream direction, and for a packet in the downstream direction, an output port number is the input port number of transfer device SW that transmits a setting request on the route selected in route candidate information INF3. Also, as an output port number for a setting request for transfer device SW through which a transmitted packet last passes, the corresponding connected port number in second connection information INF2 (or first connection information INF1) is set. In other words, for a packet in the upstream direction, the corresponding connected port number in second connection information INF2 is set as the output port number, and for a packet in the downstream direction, the corresponding connected port number in first connection information INF1 is set as the output port number.

Instructed to transmit a setting cancellation request, the route control unit 13E generates, respectively for transfer devices SW on the route corresponding to the session for which the reproduction halt request (TEARDOWN) has been transmitted, setting cancellation requests for making such transfer devices SW cancel the setting of the route corresponding to the session for which the reproduction halt request (TEARDOWN) was transmitted. Then, the route control unit 13E transmits the generated setting cancellation requests respectively to corresponding transfer devices SW. The setting cancellation request includes a pair of output port identification information and an output port number, similarly to a setting request.

Note that a setting request may further include a management ID. This makes it possible to cancel, by specifying the management ID, the setting of a route corresponding to a session for which a reproduction halt request (TEARDOWN) has been transmitted. In other words, in such a case, it is sufficient when a setting cancellation request just includes a management ID corresponding to a session for which a reproduction halt request (TEARDOWN) has been transmitted.

Figure 14:
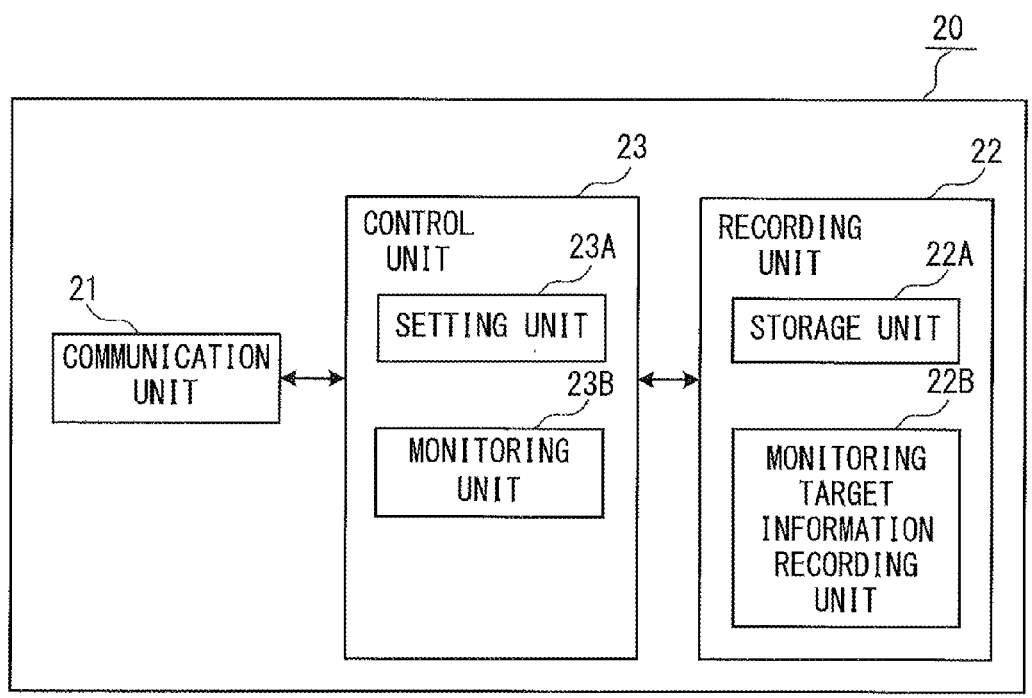
FIG. 14 is a functional block diagram illustrating a configuration example of a monitoring device in embodiment 1.

FIG. 14 is a functional block diagram illustrating a configuration example of the monitoring device 20 in embodiment 1 of the present invention. The monitoring device 20 is disposed in a position that enables the monitoring of all packets flowing between information terminal device T and server apparatus S, extracts a monitoring target packet from among all packets flowing between information terminal device T and server apparatus S, and transmits a copy of the extracted packet to the route control device 10. The monitoring device in embodiment 1 of the present invention includes a communication unit 21, a recording unit 22 and a control unit 23 as illustrated in FIG. 14.

The communication unit 21 includes for example a network interface etc., and transmits and receives a packet. More specifically, the communication unit 21 receives all packets flowing between information terminal device T and server apparatus S, and outputs the received packets to a monitoring unit 23B (which will be described later in detail). Then, the communication unit 21 transmits the received packets to the inherent transmission destinations under control of the monitoring unit 23B. For this transmission, when a received packet is a monitoring target packet, the communication unit 21 transmits a copy of the received packet to the route control device 10 under control of the monitoring unit 23B.

The recording unit 22 includes for example a RAM, a ROM, a flash memory, etc. The recording unit 22 functions as for example the work area for a CPU, the program area that stores various types of programs such as the operation program for conducting the entire control of the monitoring device 20, and the data area that stores various types of data, all these areas being included in the control unit 23.

Also, as illustrated in FIG. 14, the recording unit 22 functions as a storage unit 22A and a monitoring target information recording unit 22B. The storage unit 22A is a recording unit that temporarily stores a particular packet from among monitoring target packets (referred to just as a "particular packet" hereinafter).

The monitoring target information recording unit 22B is a recording unit that records monitoring target information INF6. Monitoring target information INF6 is managed by a setting unit 23A (which will be described later in detail), and is generated by the setting unit 23A on the basis of information included in a monitoring request transmitted from the route control device 10. FIG. 15 illustrates an example of monitoring target information INF6 in embodiment 1 of the present invention. Monitoring target information INF6 exemplified in FIG. 15 is a table in which the protocol of a monitoring target packet, i.e., the protocol that controls the session, and the port number of the port to which that packet is input are associated. The monitoring device 20 holds monitoring target information INF6 as described above, and thereby extracts a packet whose copy is to be transmitted to the route control device 10 from among received packets.

Explanations return to FIG. 14, where the control unit 23 includes for example a CPU etc., executes the operation program stored in the program area of the recording unit 22, and thereby implements the functions as the setting unit 23A and the monitoring unit 23B as illustrated in FIG. 14. Also, the control unit 23 executes the operation program so as to execute processes such as the control process that controls the monitoring device 20 entirely, a packet monitoring process, which will be described later in detail, etc.

The setting unit 23A generates monitoring target information INF6 on the basis of a list of pairs of protocols and port numbers included in received monitoring requests.

The monitoring unit 23B extracts a packet of the protocol registered in monitoring target information INF6 from among received packets, and generates a copy of the extracted packet. Then, the monitoring unit 23B transmits the generated copy to the route control device 10 and also transmits the original packet to the inherent transmission destination. For this transmission, when the extracted packet is a particular packet, the monitoring unit 23B stores the original of that particular packet in the storage unit 22A, and transmits the original of the particular packet stored in the storage unit 22A to the inherent transmission destination after receiving setting completion transmitted from the route control device 10. A particular packet is a packet that functions as a trigger for starting the transmission of a packet that is transmitted in a session that is to be established. A particular packet in embodiment 1 of the present invention is a packet of a reproduction start request (PLAY).

Figure 16:
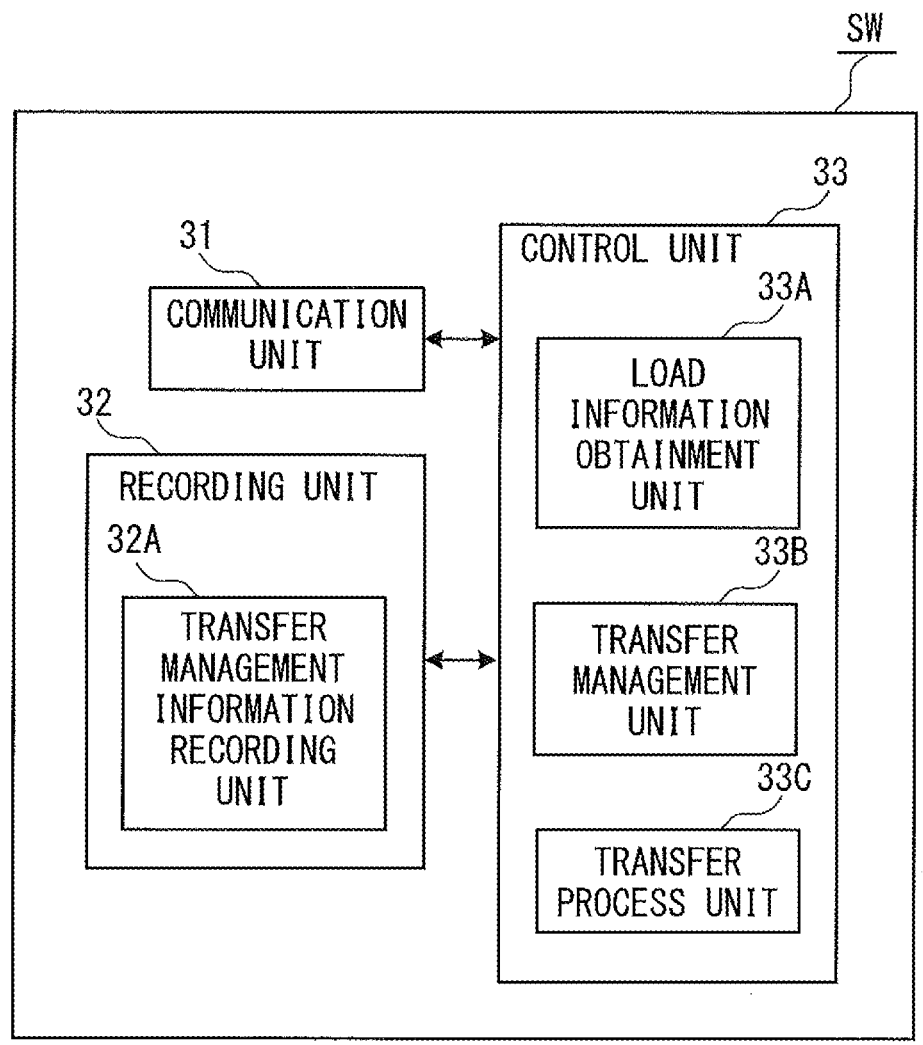
FIG. 16 is a functional block diagram illustrating a configuration example of a transfer device in embodiment 1.

FIG. 16 is a functional block diagram illustrating a configuration example of transfer device SW in embodiment 1 of the present invention. Transfer device SW is a relay node such as a switch etc., and includes a communication unit 31, a recording unit 32 and a control unit 33 as illustrated in FIG. 16.

The communication unit 31 includes for example a network interface etc., and transmits and receives a packet.

The recording unit 32 includes for example a RAM, a ROM, a flash memory, etc. The recording unit 32 functions as for example the work area for a CPU, the program area that stores various types of programs such as the operation program for conducting the entire control of transfer device SW, and the data area that stores various types of data, all these areas being included in the control unit 33.

Also, the recording unit 32 functions as a transfer management information recording unit 32A as illustrated in FIG. 16. The transfer management information recording unit 32A is a recording unit that records transfer management information INF7. Transfer management information INF7 is managed by a transfer management unit 33B (which will be described later in detail), and is referred to when for example a packet to be transmitted in a session by a transfer process unit 33C (which will be described later in detail) is transferred. FIG. 17 illustrates an example of transfer management information INF7 in embodiment 1 of present invention. Transfer management information INF7 exemplified in FIG. 17 is a table in which output port identification information and an output port number are associated, i.e., a table that stores a pair of output port identification information and an output port number included in a setting request that is transmitted from the route control device 10.

When a setting request further includes a management ID, it is possible to cancel a set route on the basis of the management ID alone by holding a pair of output port identification information and an output port number and a management ID in an associated manner. FIG. 18 illustrates another example of transfer management information INF7.

Explanations return to FIG. 16, where the control unit 33 includes for example a CPU etc., executes the operation program stored in the program area of the recording unit 32, and implements the functions as a load information obtainment unit 33A, a transfer management unit 33B and a transfer process unit 33C as illustrated in FIG. 16. Also, the control unit 33 executes the operation program so as to execute processes such as the control process that controls transfer device SW entirely, a transfer management process, which will be described later in detail, etc.

The load information obtainment unit 33A obtains information representing a load (bandwidth used for inputting and bandwidth used for outputting) on each port at a prescribed timing, and generates a load information report including the obtained information representing the load on each port. Then, the load information obtainment unit 33A transmits the generated load information report to the route control device 10. The prescribed timing is an arbitrary timing and may be for example a timing that arrives periodically or may be a timing requested by the route control device 10.

The transfer management unit 33B manages transfer management information INF7. More specifically, receiving a setting request, the transfer management unit 33B adds an entry to transfer management information INF7, and sets the content of the received setting request to the added entry. Then, the transfer management unit 33B generates a setting completion report for reporting that the content of the setting request has been set, i.e., the transfer destination of a packet transmitted in a session that is to be newly established has been set, and transmits the generated setting completion report to the route control device 10.

Also, receiving a setting cancellation request, the transfer management unit 33B identifies an entry in transfer management information INF7 on the basis of the received setting cancellation request. Then, the transfer management unit 33B deletes the identified entry after a prescribed period of time (10 seconds for example) has elapsed after the setting cancellation request was received. The purpose of deleting an identified entry when a prescribed period of time has elapsed after the reception of a setting cancellation request is to prevent a situation where the setting of a route is cancelled before the transfer of all packets of video information delivered before server apparatus S receives a reproduction halt request (TEARDOWN) and halts the reproduction.

The transfer process unit 33C transfers a packet that is to be transmitted in a session (a packet of video information delivered from server apparatus S in embodiment 1 of the present invention). More specifically, receiving a packet transmitted in a session, the transfer process unit 33C refers to transfer management information INF7 so as to identify the port number of a port for outputting the received packet. Then, from the port with the identified port number, the transfer process unit 33C outputs the received packet.

Figure 19:
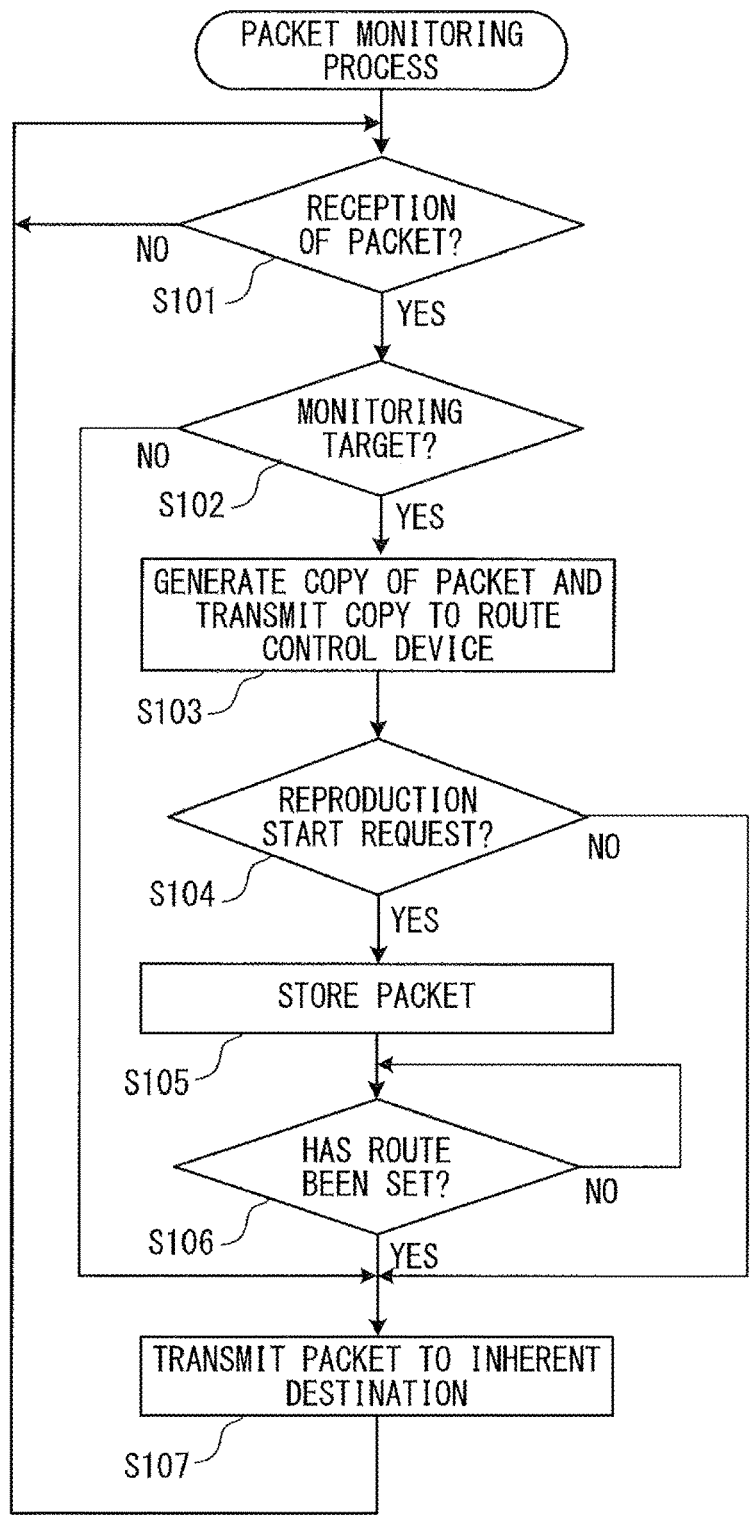
FIG. 19 illustrates an example of a flowchart for explaining the flow of a packet monitoring process in embodiment 1.

Next, with references to FIG. 19, explanations will be given for the flow of a packet monitoring process in embodiment 1 of the present invention. FIG. 19 illustrates an example of a flowchart for explaining the flow of a packet monitoring process in embodiment 1 of the present invention. A packet monitoring process according to the present invention is executed by the monitoring device 20 and is triggered by the reception of a packet.

The monitoring unit 23B determines whether a packet has been received (step S101). When it is determined by the monitoring unit 23B that a packet has not been received (No in step S101), the process repeats the process in step S101, and waits for a packet to be received. When it is determined that a packet has been received (Yes in step S101), the monitoring unit 23B further refers to monitoring target information INF6 so as to determine whether the received packet is a monitoring target (step S102). When it is determined by the monitoring unit 23B that the received packet is not a monitoring target (No in step S102), the process proceeds to step S107, which will be described later.

When it is determined that the received packet is a monitoring target (Yes in step S102), the monitoring unit 23B generates a copy of the received packet and transmits the generated copy to the route control device 10 (step S103). Then, the monitoring unit 23B determines whether the received packet is a particular packet, i.e., a packet of a reproduction start request (PLAY) in embodiment 1 of the present invention (step S104).

When it is determined by the monitoring unit 23B that the received packet is not a particular packet (No in step S104), the process proceeds to step S107, which will be described later. When it is determined that the received packet is a particular packet (Yes in step S104), the monitoring unit 23B stores the received packet in the storage unit 22A (step S105).

Then, the monitoring unit 23B determines whether the setting of a route of a session that is to be newly established has been completed in transfer devices SW on the route (step S106). When setting completion has been received, the monitoring unit 23B determines that the setting of the route has been completed, and when setting completion has not been received, the monitoring unit 23B determines that the setting of the route has not been completed.

When it is determined by the monitoring unit 23B that the setting of the route has not been completed (No in step S106), the process repeats the process in step S106 so as to wait for the setting of the route to be completed. When it is determined that the setting of the route has been completed (Yes in step S106), the monitoring unit 23B transmits the original packet to the inherent destination (step S107). Then, the process returns to the process in step S101 so as to repeat the above process.

Figure 20:
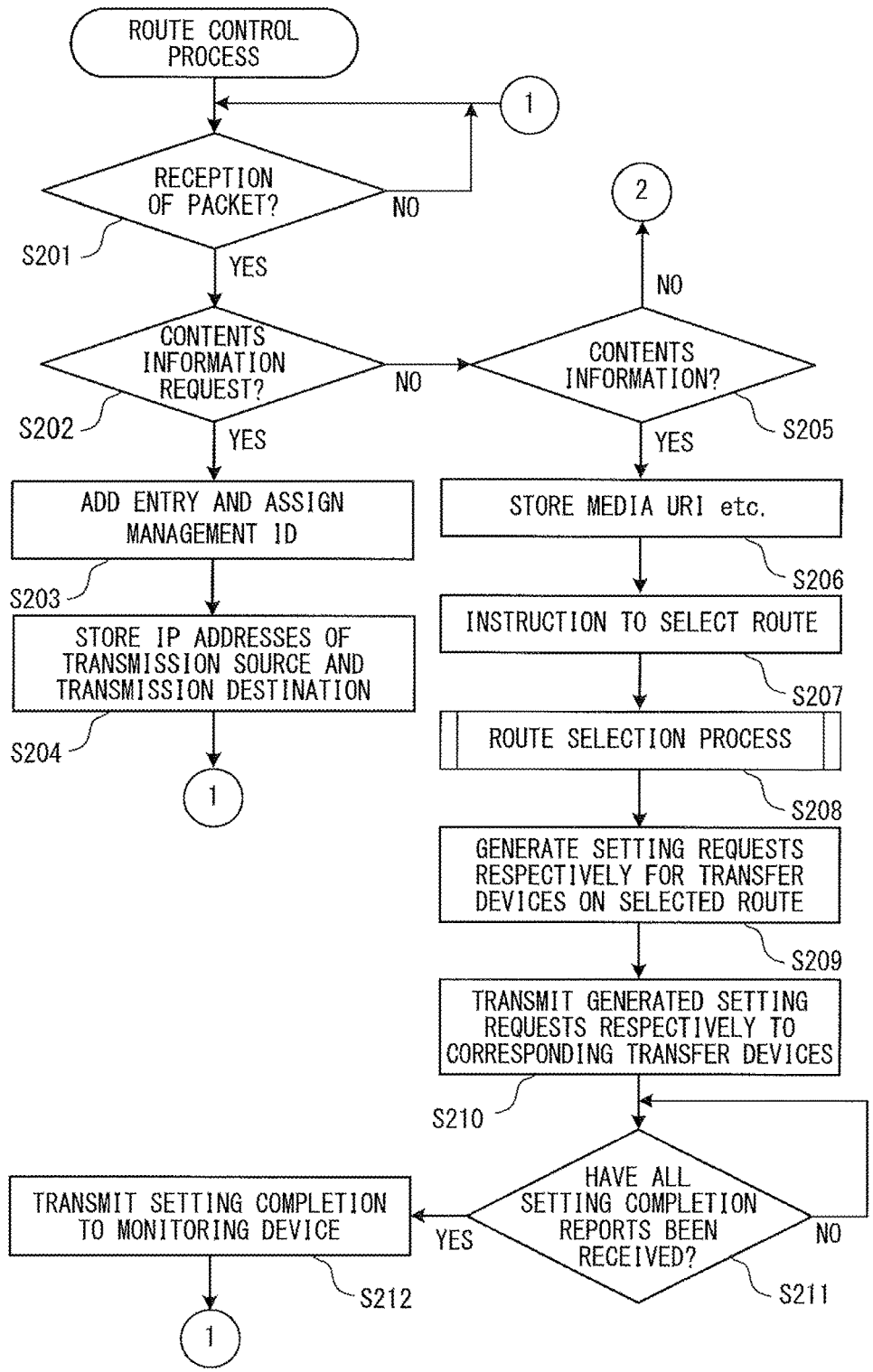
FIG. 20 illustrates a portion of an example of a flowchart for explaining the flow of a route control process in embodiment 1.
Figure 21:
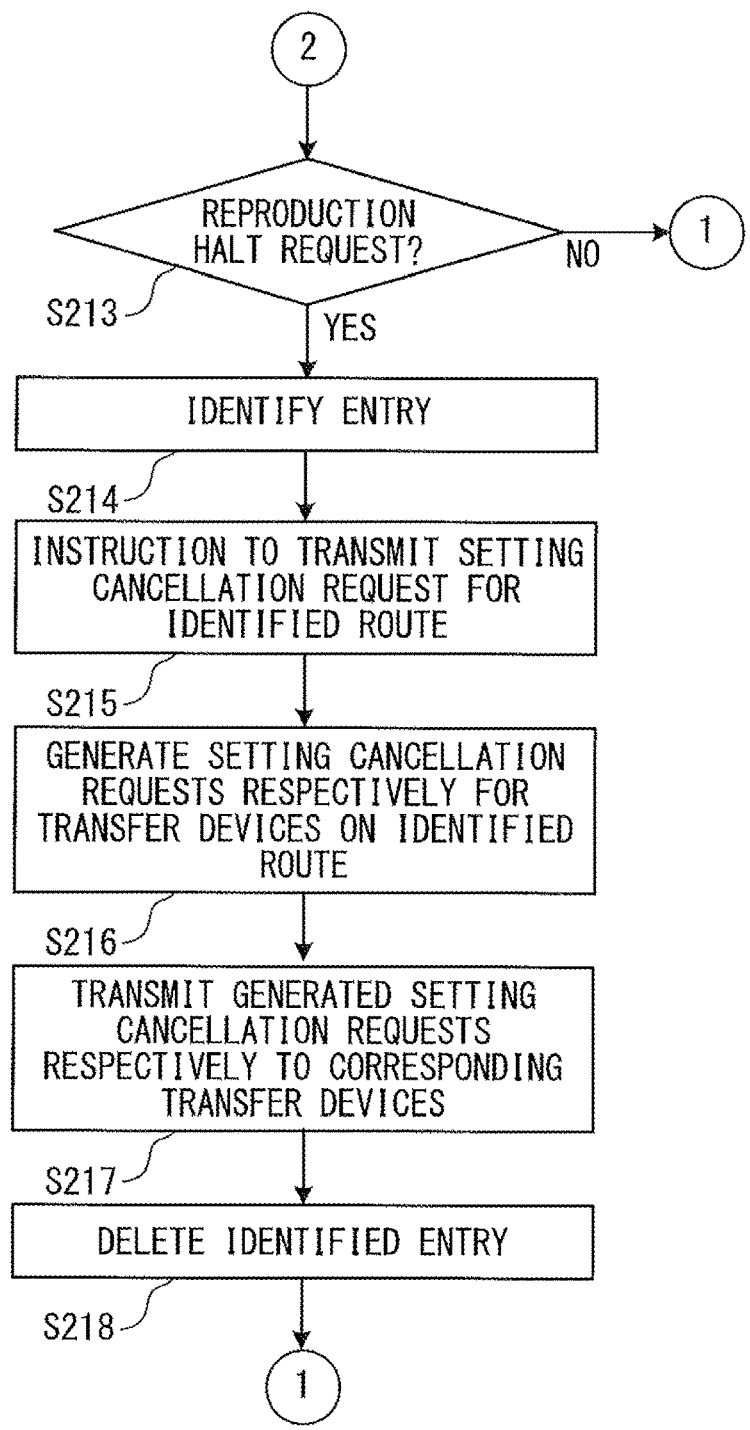
FIG. 21 illustrates a remaining portion of the example of the flowchart for explaining the flow of the route control process in embodiment 1.

Next, with references to FIG. 20 and FIG. 21, explanations will be given for the flow of a route control process in embodiment 1 of the present invention. FIG. 20 and FIG. 21 respectively illustrate a portion and the remaining portion of an example of a flowchart for explaining the flow of a route control process in embodiment 1 of the present invention. A route control process according to the present invention is executed by the route control device 10 and is triggered by the reception of a copy packet that is transmitted by the monitoring device 20. Note that this process in embodiment 1 of the present invention is explained based on an assumption that a copy packet transmitted by the monitoring device 20 is a packet based on RTSP.

The session management unit 13C determines whether an RTSP-based packet transmitted from the monitoring device 20 has been received (step S201). When it is determined by the session management unit 13C that an RTSP-based packet has not been received (No in step S201), the process repeats the process in step S201, and waits for an RTSP-based packet to be received.

When it is determined that a packet based on RTSP has been received (Yes in step S201), the session management unit 13C further determines whether the received RTSP-based packet is a packet of a contents information request (DESCRIBE) (step S202). When it is determined that the received RTSP-based packet is a packet of contents information request (DESCRIBE) (Yes in step S202), the session management unit 13C adds an entry to session management information INF5, and stores, in the "management ID" section of the added entry, the management ID assigned to a session that is to be newly established (step S203). Then, the session management unit 13C stores the IP addresses of the transmission source and transmission destination of a packet of a contents information request (DESCRIBE) in the corresponding section of the added entry (step S204). Thereafter, the process returns to the process in step S201, and the above process is repeated.

When it is determined in the process in step S202 that the received RTSP-based packet is not a packet of a contents information request (DESCRIBE) (No in step in S202), the session management unit 13C further determines whether the received RTSP-based packet is a packet of contents information (step S205).

When it is determined that the received RTSP-based packet is a packet of contents information (Yes in step S205), the session management unit 13C stores the media URI, the protocol, etc. of the contents information in the corresponding section of the corresponding entry in session management information INF5 (step S206). Then, the session management unit 13C instructs the route selection unit 13D to select a route (step S207).

Instructed to select a route, the route selection unit 13D executes a route selection process, and selects a route of a session that is to be newly established (step S208). Then, the route control unit 13E generates setting requests respectively for transfer devices SW on the selected route (step S209), and transmits the generated setting requests respectively to corresponding transfer devices SW (step S210).

Thereafter, the route control unit 13E determines whether setting completion reports have been received from all transfer devices SW to which setting requests were transmitted (step S211). When it is determined by the route control unit 13E that not all setting completion reports have been received (No in step S211), the process repeats the process in step S211, and waits for all setting completion reports to be received. When it is determined that all setting completion reports have been received (Yes in step S211), the route control unit 13E transmits setting completion to the monitoring device 20 (step S212). Then, the process returns to the process in step S201, and repeats the above process.

When it is determined in the process in step S205 that the received RTSP-based packet is not a packet of contents information (No in step S205), the session management unit 13C further determines whether the received RTSP-based packet is a packet of a reproduction halt request (TEARDOWN) (step S213). When it is determined by the session management unit 13C that the received RTSP-based packet is not a packet of reproduction halt request (TEARDOWN) (No in step S213), the process returns to the process in step S201, and repeats the above process.

When it is determined that the received RTSP-based packet is a packet of a reproduction halt request (TEARDOWN) (Yes in step 213), the session management unit 13C identifies the corresponding entry in session management information INF5 on the basis of the reproduction halt request (TEARDOWN) (step S214). Then, the session management unit 13C instructs the route control unit 13E to transmit a setting cancellation request of the route corresponding to the route ID in the identified entry (route of the session corresponding to the reproduction halt request (TEARDOWN)) (step S215).

Instructed to transmit a setting cancellation request, the route control unit 13E generates setting cancellation requests respectively for transfer devices SW on the route corresponding to the route ID of the identified entry (step S216), and transmits the generated setting cancellation requests respectively to transfer devices SW (step S217). Then, the session management unit 13C deletes the identified entry (step S218). Thereafter, the process returns to the process in step S201, and repeats the above process.

Figure 22:
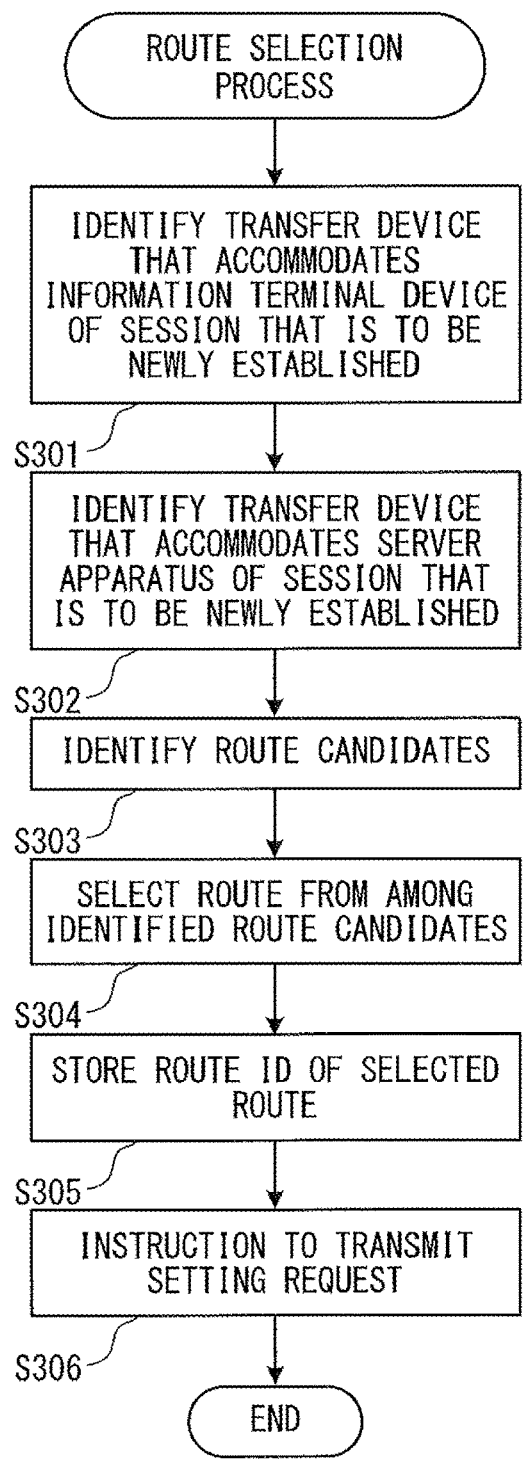
FIG. 22 illustrates an example of a flowchart for explaining the flow of a route selection process in embodiment 1.

Next, with references to FIG. 22, explanations will be given for the flow of a route selection process in embodiment 1 of the present invention. FIG. 22 illustrates an example of a flowchart for explaining the flow of a route selection process in embodiment 1 of the present invention. A route selection process in the present invention is a process corresponding to the process in step S208 of the above route control process.

The route selection unit 13D refers to first connection information INF1 so as to identify transfer device SW that accommodates information terminal device T of a session that is to be newly established, i.e., transfer device SW accommodating information terminal device T that transmitted contents information request (DESCRIBE) (step S301). Also, the route selection unit 13D refers to second connection information INF2 so as to identify transfer device SW that accommodates server apparatus S of a session that is to be newly established, i.e., server device that delivers video information (step S302). Thereafter, the route selection unit 13D refers to route candidate information INF3 so as to identify route candidates on the basis of transfer device SW identified in step S301 and step S302.

Then, the route selection unit 13D selects a route to be allocated for a session that is to be newly established from among the identified route candidates (step S304), and stores the route ID of the selected route in the "route ID" section of the corresponding entry in session management information INF5 (step S305). Then, the route selection unit 13D instructs the route control unit 13E to transmit a setting request. Then, this process is terminated, and the process proceeds to the process in step S209 of the route control process.

Figure 23:
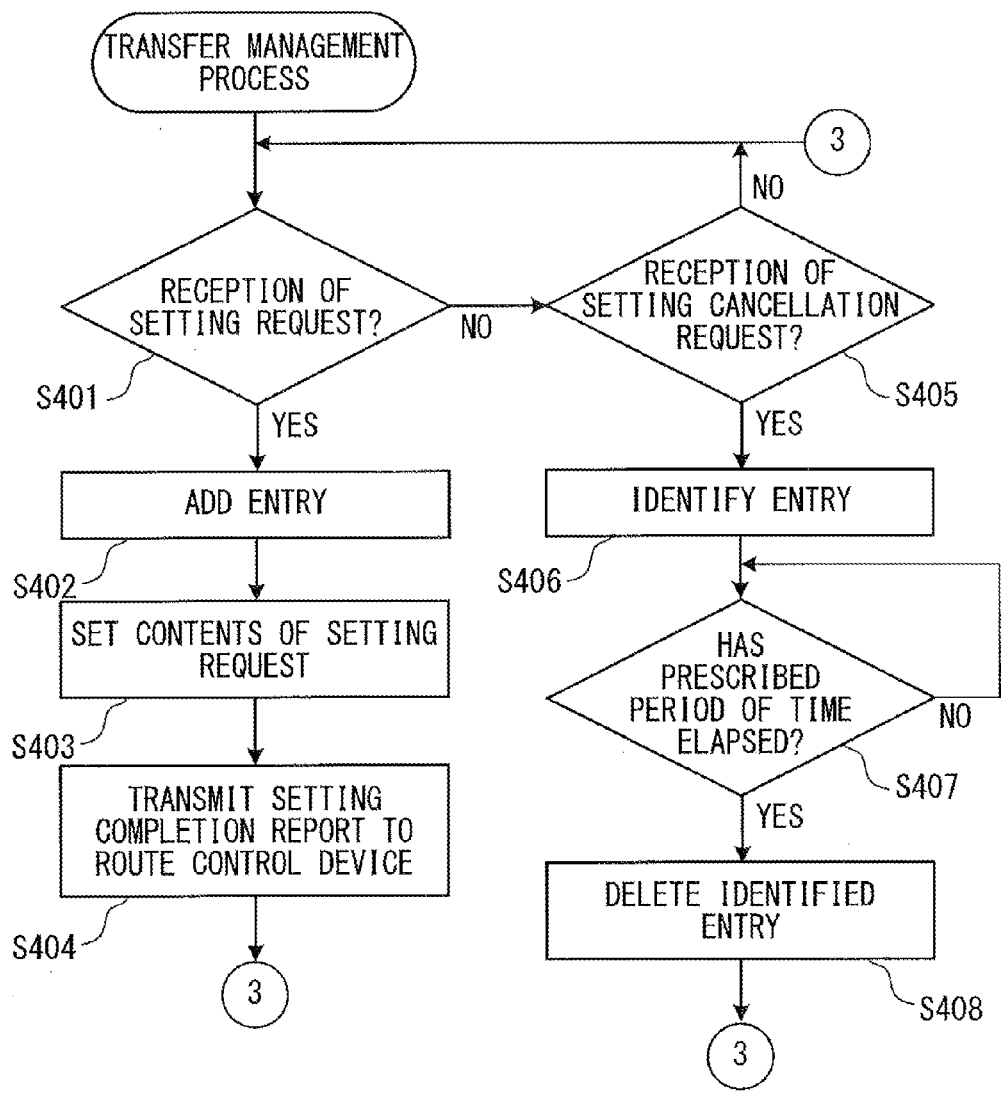
FIG. 23 illustrates an example of a flowchart for explaining the flow of a transfer management process in embodiment 1.

Next, with references to FIG. 23, explanations will be given for the flow of a transfer management process in embodiment 1 of the present invention. FIG. 23 illustrates an example of a flowchart for explaining the flow of a transfer management process in embodiment 1 of the present invention. A transfer management process in the present invention is executed in each transfer device SW and triggered by the reception of a setting request.

The transfer management unit 33B determines whether a setting request transmitted from the route control device 10 has been received (step S401). When it is determined that a setting request has been received (Yes in step S401), the transfer management unit 33B adds an entry to transfer management information INF7 (step S402), and sets the content of the received setting request in the added entry (step S403).

Then, the transfer management unit 33B transmits a setting completion report to the route control device 10 (step S404). Then, the process returns to the process in step S401, and repeats the above process.

When it is determined in the process in step S401 that a setting request has not been received (Yes in step S401), the transfer management unit 33B further determines whether a setting cancellation request has been received (step S405). When it is determined by the transfer management unit 33B that a setting cancellation request has not been received (No in step S405), the process returns to the process in step S401, and repeats the above process.

When it is determined that a setting cancellation request has been received (Yes in step S405), the transfer management unit 33B identifies an entry in transfer management information INF7 on the basis of the received setting cancellation request (step S406). Then, the transfer management unit 33B determines whether a prescribed period of time has elapsed after the reception of the setting cancellation request (step S407). When it is determined by the transfer management unit 33B that the prescribed period of time has not elapsed (No in step S407), the process repeats the process in step S407, and waits for the prescribed period of time to elapse.

When it is determined that the prescribed period of time has elapsed (Yes in step S407), the transfer management unit 33B deletes the identified entry (step S408). Then, the process returns to the process in step S401, and repeats the above process.

Figure 24:
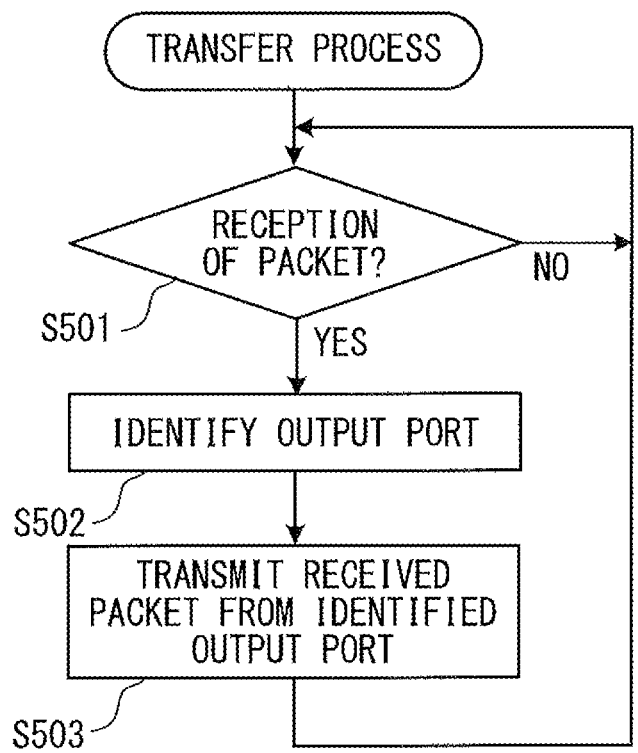
FIG. 24 illustrates an example of a flowchart for explaining the flow of a transfer process in embodiment 1.

Next, with reference to FIG. 24, the flow of a transfer process in embodiment 1 of the present invention will be explained. FIG. 24 illustrates an example of a flowchart for explaining the flow of a transfer process in embodiment 1 of the present invention. A transfer process according to the present invention is executed by each transfer device SW and is triggered by the reception of a packet transmitted in an established session.

The transfer process unit 33C determines whether a packet transmitted in a session has been received (step S501). When it is determined by the transfer process unit 33C that a packet transmitted in a session has not been received (No in step S501), the process repeats the process in step S501, and waits for a packet transmitted in a session to be received.

When it is determined that a packet transmitted in a session has been received (Yes in step S501), the transfer process unit 33C refers to transfer management information INF7 so as to identify the port number of a port for outputting the received packet (step S502). Then, the transfer process unit 33C transfers the received packet via the port with the identified port number (step S503). Thereafter, the process returns to the process in step S501, and repeats the above process.

Next, by reference to FIG. 25 etc., the schematic flow of data up to the delivery of a video in the entire system in the embodiment 1 of the present invention will be explained. FIG. 25 illustrates a specific example for explaining the flow up to the delivery of a video in the entire system in embodiment 1 of the present invention. Note that it is assumed that the system illustrated in this specific example is the network system 100 illustrated in FIG. 1. It is also assumed that a session has already been established between information terminal device T1 and server apparatus S1 and that a packet transmitted in that session is transferred by using first route R1. This specific example is an example of a process between when information terminal device T2 newly establishes a session with server apparatus S2 and when a video is delivered. Also, the numbers in the parentheses in FIG. 25 represent step numbers corresponding to the above respective processes.

Information terminal device T2 transmits contents information request (DESCRIBE) to server apparatus S2 (step S005). The monitoring device 20 receives a contents information request (DESCRIBE), and transmits a copy of the contents information request (DESCRIBE) (step S103) because the contents information request (DESCRIBE) is a monitoring target. Also, the monitoring device 20 transmits the original of the contents information request (DESCRIBE) to server apparatus S2 (step S107).

In response to the contents information request (DESCRIBE), server apparatus S2 returns contents information to information terminal device T2 (step S006). The monitoring device 20 receives the contents information, and transmits a copy of the contents information to the route control device 10 (step S103) because the contents information is monitoring target. Also, the monitoring device 20 transmits the original of the contents information to information terminal device T2 (step S107).

Receiving the copy of the contents information, the route control device 10 selects a route of a session that is to be newly established. In this specific example, a packet transmitted in the session between information terminal device T1 and server apparatus S1 is transferred by using first route R1. When load information INF4 illustrated in FIG. 12 is load information INF4 of this specific example, the load on first route R1 is heavier than that on second route R2, and accordingly the route control device 10 selects second route R2 as a route for the session between information terminal device T2 and server apparatus S2. Then, the route control device 10 transmits, to transfer devices SW1 SW2, SW3 and SW4 on selected second route R2, a setting request for requesting that these devices set second route R2 for the session that is to be established between information terminal device T2 and server apparatus S2 (step S210).

Receiving the setting request, transfer devices SW1, SW2, SW3 and SW4 set second route R2, and transmit setting completion reports to the route control device 10 (step S404). Receiving setting completion reports from all of transfer devices SW1, SW2, SW3 and SW4, the route control device 10 transmits setting completion to the monitoring device 20 (step S212). FIG. 26A illustrates an example of transfer management information INF7 of transfer device SW1 in this specific example, and the portion enclosed by the dashed line is the portion newly set by transfer device SW1. Also, FIG. 26B illustrates an example of transfer management information INF7 of transfer device SW2 in this specific example, and the portion enclosed by the dashed line is the portion newly set by transfer device SW2. Also, FIG. 27A illustrates an example of transfer management information INF7 of transfer device SW3 in this specific example, and the portion enclosed by the dashed line is the portion newly set by transfer device SW3. Also, FIG. 27B illustrates an example of transfer management information INF7 of transfer device SW4 in this specific example, and the portion enclosed by the dashed line is the portion newly set by transfer device SW4.

Receiving the contents information, information terminal device 12 transmits a reproduction preparation request (SETUP) to server apparatus S2 (step S007). The monitoring device 20 receives the reproduction preparation request (SETUP), and transmits a copy of the reproduction preparation request (SETUP) to the route control device 10 (step S103) because the reproduction preparation request (SETUP) is a monitoring target. Also, the monitoring device 20 transmits the original of the reproduction preparation request (SETUP) to the server apparatus S2 (step S107).

Receiving a reproduction preparation request (SETUP), server apparatus S2 conducts preparation such as the allocation of resources, and a session is established. When a session has been established, and it has become ready for reproduction, server apparatus S2 returns preparation completion to information terminal device T2 (step S008). The monitoring device 20 receives preparation completion, and transmits a copy of preparation completion to the route control device 10 (step S103) because preparation completion is a monitoring target. Also, the monitoring device 20 transmits the original of preparation completion to information terminal device T2 (step S107).

Receiving the copy of preparation completion, the route control device 10 transmits a reproduction start request (PLAY) in accordance with an instruction from the user (step S009). The monitoring device 20 receives the reproduction start request (PLAY), and the monitoring device 20 transmits a copy of the reproduction start request (PLAY) to the route control device 10 (step S103) because a reproduction start request (PLAY) is a monitoring target. Having already received setting completion, the monitoring device 20 transmits the original of the reproduction start request (PLAY) to server apparatus S2 (step S107).

In response to the reproduction start request (PLAY), server apparatus S2 returns ACK to information terminal device T2 (step S010), and starts the delivery of video information (step S011). A packet transmitted in the session, i.e., a packet of the video information is transmitted to information terminal device T2 via second route R2. The monitoring device 20 receives ACK, and transmits a copy of ACK to the route control device 10 (step S103) because ACK is a monitoring target. Also, the monitoring device 20 transmits the original of ACK to information terminal device T2 (step S107).

In embodiment 1 above, the route control device 10 detects that a session is to be newly established, on the basis of a packet of the protocol that controls the establishment of the session, selects as the route for the session a route with a light load from among a plurality of route candidates, and establishes the selected route. Thereby, it is possible to improve the quality of a session that is newly established while suppressing influence on a session that has already been established.

Also, in embodiment 1 above, the route control device 10 instructs a transfer device on a route of a session to be disconnected to cancel the setting of the route, on the basis of a packet of the protocol that controls the disconnection of the session. Also, in embodiment 1 above, transfer device SW cancels the setting of a route when a prescribed of period of time has elapsed after the instruction to cancel the setting of the route was given. Thereby, it is possible to prevent a situation where the setting of a route is cancelled before all packets to be transmitted in a session have been transmitted via the set route. Also, in embodiment 1 above, the route control device 10 selects as a route of a session a route with a light load from among a plurality of route candidates and establishes the selected route before that session is established. Thereby, it is possible to prevent a situation where a packet flows in a session before a route of the selected session is established. Accordingly, it is possible to prevent temporary influence on a session that has already been established.

Also, in embodiment 1 above, the route control device 10 identifies a corresponding entry in session management information INF5 on the basis of a packet of the protocol that controls the disconnection of a session, and deletes the identified entry. Thereby, it is possible to use memory resources effectively and to construct the network system 100 by using inexpensive devices. Also, in embodiment 1 above, transfer device SW deletes a corresponding entry in transfer management information INF7 when a session has been disconnected. Thereby, it is possible to use memory resources effectively and to construct the network system 100 by using inexpensive devices.

Also, in embodiment 1 above, the monitoring device 20 extracts a packet of the protocol that controls a session from among packets flowing between devices for which the session is to be established, and transmits a copy of the extracted packet to the route control device 10. Thereby, the route control device 10 can control the route of a packet transmitted in the session. Also, in embodiment 1 above, the monitoring device 20 temporarily holds a packet that functions as a trigger for starting the transmission of a packet that is transmitted in the session, and transmits that packet to the inherent transmission destination after the establishment of a route of the session. Thereby, it is possible to prevent a situation in which a packet flows in a session before a route of a selected session is established. This makes it possible to prevent temporary influence on a session that has already been established.

Embodiment 2

In embodiment 1, the present invention was explained by using an example of a video delivery system. However, the scope of the present invention is not limited to a video delivery system, but can also be applied to systems in which a packet of the protocol that controls a session is transmitted or received prior to the establishment of the session, such as for example a videotelephony system etc. In other words, the present invention can also be applied to various systems such as an IP videotelephony system, an instant message system, etc. In embodiment 2, explanations will be given based on an assumption that the network system 100 is a videotelephony system.

FIG. 28 illustrates a configuration example of the network system 100 in embodiment 2 of the present invention. The network system 100 in embodiment 2 of the present invention is a videotelephony system as described above. The fundamental configuration of the network system 100 in embodiment 2 of the present invention is similar to that in embodiment 1. However, the network system 100 in embodiment 2 of the present invention as illustrated in FIG. 28 includes information terminal devices T3 and T4 instead of server apparatuses S1 and S2. Note that routes of the videotelephony system in embodiment 2 of the present invention do not pass through server apparatus S. In other words, the system is an example of a case where information terminal devices T make telephone calls to each other. Also, similarly to the case illustrated in FIG. 1, the numbers in the parentheses in FIG. 28 represent port numbers of connected ports, and the number strings in the brackets represent IP addresses.

Figure 29:
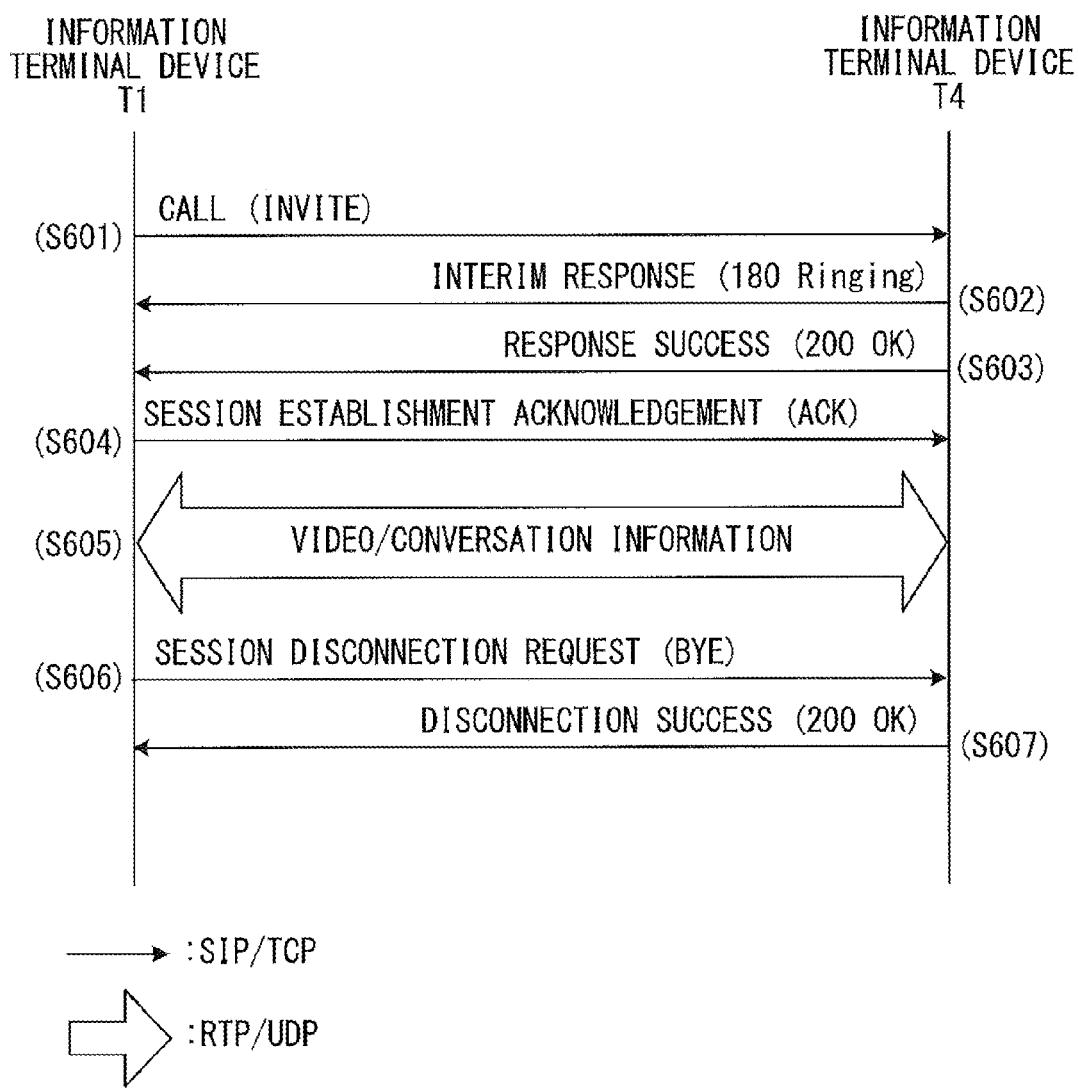
FIG. 29 illustrates an example of a sequence of general videotelephony.

FIG. 29 illustrates an example of a sequence of general videotelephony. The example illustrated in FIG. 29 is a case where information terminal device T1 illustrated in FIG. 28 makes a call (INVITE) to information terminal device T4.

When the user has performed a prescribed manipulation in order to use the function of videotelephony with information terminal device T4, information terminal device T1 uses Session Initiation Protocol (SIP)/TCP, and transmits call (INVITE) to information terminal device T4 (step S601). In this example, FIG. 30 illustrates an example of call (INVITE). Receiving call (INVITE), information terminal device T4 performs a calling process such as for example outputting ringer sound etc., and also uses SIP/TCP so as to return interim response (180 Ringing) to information terminal device T1 so as to report that the situation is during the calling (step S602).

When the user of information terminal device T4 answers the calling by for example turning the earpiece into the off-hook state or by other means, information terminal device T4 uses SIP/TCP so as to transmit response success (200 OK) to information terminal device T1 (step S603). Receiving response success (200 OK), information terminal device T1 uses SIP/TCP so as to transmit session establishment acknowledgement (ACK) to information terminal device T4 (step S604), and a session is established between information terminal device T1 and information terminal device T4. When a session has been established, bidirectional communications based on RTP are conducted (step S605).

When the user of information terminal device T1 performs a prescribed manipulation in order to terminate the call of videotelephony by for example turning the earpiece into the on-hook state, information terminal device T1 uses SIP/TCP so as to transmit session disconnection request (BYE) to information terminal device T4 (step S606). In this example, FIG. 31 illustrates an example of a session disconnection request (BYE). Receiving the session disconnection request (BYE), information terminal device T4 performs a process of disconnecting the session, and the session is terminated. Then, information terminal device T4 uses SIP/TCP so as to return disconnection success (200 OK) to information terminal device T1 (step S607).

Explanations will now be given for the route control device 10 in embodiment 2 of present invention. The fundamental configuration of the route control device 10 in embodiment 2 of the present invention is similar to that in embodiment 1. However, the configuration of session management information INF5 is slightly different from the case of embodiment 1 because a packet based on SIP is a monitoring target in embodiment 2 of the present invention. Also, the functions of the session management unit 13C, the route selection unit 13D and the route control unit 13E are slightly different from those in embodiment 1.

FIG. 32 illustrates an example of first connection information INF1 in embodiment 2 of the present invention, and is an example of first connection information INF1 corresponding to the example illustrated in FIG. 28.

FIG. 33 illustrates an example of session management information INF5 in embodiment 2 of the present invention. Session management information INF5 in embodiment 2 of present invention manages pieces of information on sessions in an associated manner for each session similarly to the case of embodiment 1.

Information on a session in embodiment 2 of the present invention includes the IP address of first information terminal device T, the IP address of second information terminal device T, the protocol, the route ID and the CALL-ID as illustrated in FIG. 33. Also, information on a session may include the bandwidth (Mbps) as illustrated in FIG. 33.

The IP address of first information terminal device T is the IP address of information terminal device T that transmitted call (INVITE) in a corresponding session, and the IP address of second information terminal device T is the IP address of information terminal device T to which call (INVITE) was transmitted in the corresponding session. These IP addresses are the transmission source IP address (the IP address of first information terminal device T) and the transmission destination IP address (IP address of second information terminal device T) included in the packet header of call (INVITE), and are stored by the session management unit 13C.

A protocol is the protocol used in a corresponding session. In embodiment 2 of the present invention, the protocol used for exchanging video and conversation information included in call (INVITE) (exemplified in FIG. 30) is stored by the session management unit 13C.

CALL-ID is an identifier that can uniquely identify CALL. CALL-ID included in call (INVITE) (exemplified in FIG. 30) is stored by the session management unit 13C in embodiment 2 of the present invention. A bandwidth (Mbps) is a bandwidth used for a corresponding session, and a bandwidth included in call (INVITE) (exemplified in FIG. 30) is stored by the session management unit 13C in embodiment 2 of the present invention.

The session management unit 13C manages a session that is being established on the basis of a packet of the protocol that controls a session that is to be established, i.e., a packet that is a monitoring target for the monitoring device 20. In embodiment 2 of present invention, the session management unit 13C manages a session that is being established, on the basis of a packet based on SIP.

More specifically, when a packet transmitted from the monitoring device 20 has been received and the received packet is call (INVITE), the session management unit 13C adds an entry to session management information INF5, and stores, in the "management ID" section of the added entry, the management ID assigned to a session that is to be newly established. Then, the session management unit 13C stores the transmission source IP address and the transmission destination IP address included in the packet header of call (INVITE), in the "IP address of first information terminal device T" section and the "IP address of second information terminal device T", respectively.

Also, the session management unit 13C stores CALL-ID, the protocol and the bandwidth (Mbps) included in call (INVITE) in the corresponding section of the corresponding entry in session management information INF5. Then, the session management unit 13C reports for example a management ID to the route selection unit 13D so as to instruct the route selection unit 13D to select a route for transmitting video/conversation information that is to be transmitted in a session that is to be newly established.

When the received packet is a session disconnection request (BYE), the session management unit 13C identifies a corresponding entry in session management information INF5 on the basis of CALL-ID included in the session disconnection request (BYE). Then, the session management unit 13C reports the management ID of the identified entry to the route control unit 13E so as to instruct the route control unit 13E to transmit setting cancellation requests to respective transfer devices SW on the route specified by the route ID of the identified entry (route of the session corresponding to the session disconnection request (BYE)). Then, the session management unit 13C deletes the identified entry after the route control unit 13E transmits setting cancellation requests.

As described above, on the basis of a packet of the protocol that controls a session transmitted prior to the establishment of the session, the session management unit 13C detects that the session is to be newly established. Detecting that a session is to be newly established, the session management unit 13C assigns a management ID to that session, and registers information on that session in session management information INF5 so that session management information INF5 holds the information. Then, on the basis of a packet that controls the disconnection of the session, the session management unit 13C deletes information on the session that has been held. Thereby, the session management unit 13C manages a session that is being established, on the basis of a packet of the protocol that controls a session that is to be established.

Instructed to select a route, the route selection unit 13D selects a route with a light load from among route candidates. More specifically, the route selection unit 13D identifies an entry in session management information INF5 on the basis of the reported management ID, and refers to first connection information INF1 so as to identify transfer device SW that accommodates first information terminal device T and second information terminal device T of the identified entry.

Then, the route selection unit 13D refers to route candidate information INF3 so as to identify route candidates that connect first information terminal device T and second information terminal device T of the session that is to be newly established, on the basis of transfer device SW that accommodates first information terminal device T and transfer device SW that accommodates second information terminal device T.

Then, the route selection unit 13D selects a route from among the identified route candidates, and stores the route ID of the selected route in the "route ID" section of the corresponding entry in session management information INF5. Then, the route selection unit 13D reports for example the management ID to the route control unit 13E so as to instruct the route control unit 13E to transmit a setting request.

The route control unit 13E controls a route for transferring a packet that is to be transmitted in an established session. More specifically, instructed to transmit a setting request, the route control unit 13E generates setting requests respectively for transfer devices SW on the selected route. Thereafter, the route control unit 13E transmits the generated setting requests respectively to corresponding transfer devices SW. When transfer completion reports have been received from all transfer devices SW to which the setting requests were transmitted, the route control unit 13E transmits, to the monitoring device 20, setting completion, which indicates that setting of the transfer destination in transfer devices SW on the route has been completed.

A setting request is for reporting, to transfer devices SW on a selected route, the transfer destination of a packet that is to be transmitted in an established session, and includes a pair of output port identification information and an output port number. There are two pairs of output port identification information and output port numbers included in a setting request; one is for a packet in the first direction (packet transmitted from first information terminal device T to second information terminal device T) and the other is for a packet in the second direction (packet transmitted from second information terminal device T to first information terminal device T). Output port identification information is information representing a condition for outputting a packet from the port with a corresponding port number, and is for example a combination of a transmission source IP address, a transmission destination IP address, an input port number and a protocol.

As a transmission source IP address, the IP address of first information terminal device T or second information terminal device T of the corresponding entry in session management information INF5 is set. That is, the transmission source IP address is the IP address of first information terminal device T or second information terminal device T of a session that is to be established. For a packet in the first direction, the transmission source IP address is the IP address of first information terminal device T, and for a packet in the second direction, the transmission source IP address is the IP address of second information terminal device T.

Similarly, as a transmission destination IP address, the IP address of first information terminal device T or second information terminal device T of the corresponding entry in session management information INF5 is set. In other words, the transmission destination IP address is the IP address of first information terminal device T or second information terminal device T of a session that is to be established. For a packet in the first direction, the transmission source IP address is the IP address of second information terminal device T, and for a packet in the second direction, the transmission destination IP address is the IP address of first information terminal device T.

As an input port number, the input port number of transfer device SW that transmits a setting request on the route selected in route candidate information INF3 is set. In other words, an input port number is the port number of a port to which a packet is input in transfer device SW that transmits a setting request, when the selected route is used. Note that route candidate information INF3 exemplified in FIG. 11 is an example of a packet in the first direction, and for a packet in the second direction, an input port number is the output port number of transfer device SW that transmits a setting request on the route selected in route candidate information INF3. Also, as an input port number for a setting request for transfer device SW through which a transmitted packet first passes, the corresponding connected port number in first connection information INF1 is set.

As a protocol, the protocol of a corresponding entry in session management information INF5 is stored.

As an output port number, the output port number of transfer device SW that transmits a setting request on the route selected in route candidate information INF3 is set. In other words, an output port number is the port number of a port from which a packet is output in transfer device SW that transmits a setting request, when the selected route is used. Note that route candidate information INF3 exemplified in FIG. 11 is an example of a packet in the first direction, and for a packet in the second direction, an output port number is the input port number of transfer device SW that transmits a setting request on the route selected in route candidate information INF3. Also, as an output port number for a setting request for transfer device SW through which a transmitted packet last passes, the corresponding connected port number in first connection information INF1 is set.

Instructed to transmit a setting cancellation request, the route control unit 13E generates, respectively for transfer devices SW on the route corresponding to the session for which the session disconnection request (BYE) has been transmitted, setting cancellation requests for making such transfer devices SW cancel the setting of the route corresponding to the session for which the session disconnection request (BYE) was transmitted. Then, the route control unit 13E transmits the generated setting cancellation requests respectively to corresponding transfer devices SW. The setting cancellation request includes a pair of output port identification information and an output port number similarly to a setting request.

Note that a setting request may further include a management ID or CALL-ID. This makes it possible to cancel the setting of a route corresponding to a session for which a session disconnection request (BYE) has been transmitted, by specifying the management ID or CALL-ID. In other words, in such a case, it is sufficient when a session disconnection request (BYE) includes a management ID or CALL-ID alone that corresponds to a session for which a session disconnection request (BYE) has been transmitted.

Next, with references to FIG. 34, explanations will be given for the flow of a packet monitoring process in embodiment 2 of the present invention. FIG. 34 illustrates an example of a flowchart for explaining the flow of a packet monitoring process in embodiment 2 of the present invention. A packet monitoring process according to the present invention is executed by the monitoring device 20 and is triggered by the reception of a packet. Note that the same processes as those in embodiment 1 are denoted by the same symbols.

The monitoring unit 23B determines whether a packet has been received (step S101). When it is determined by the monitoring unit 23B that a packet has not been received (No in step S101), the process repeats the process in step S101, and waits for a packet to be received. When it is determined that a packet has been received (Yes in step S101), the monitoring unit 23B further refers to monitoring target information INF6 so as to determine whether the received packet is a monitoring target (step S102). When it is determined by the monitoring unit 23B that the received packet is not a monitoring target (No in step S102), the process proceeds to the process in step S107, which will be described later.

When it is determined that the received packet is a monitoring target (Yes in step S102), the monitoring unit 23B generates a copy of the received packet, and transmits the generated copy to the route control device 10 (step S103). Then, the monitoring unit 23B determines whether the received packet is a particular packet, i.e., a packet of response success (200 OK) in embodiment 2 of the present invention (step S701). The subsequent processes are similar to those explained in embodiment 1.

Figure 35:
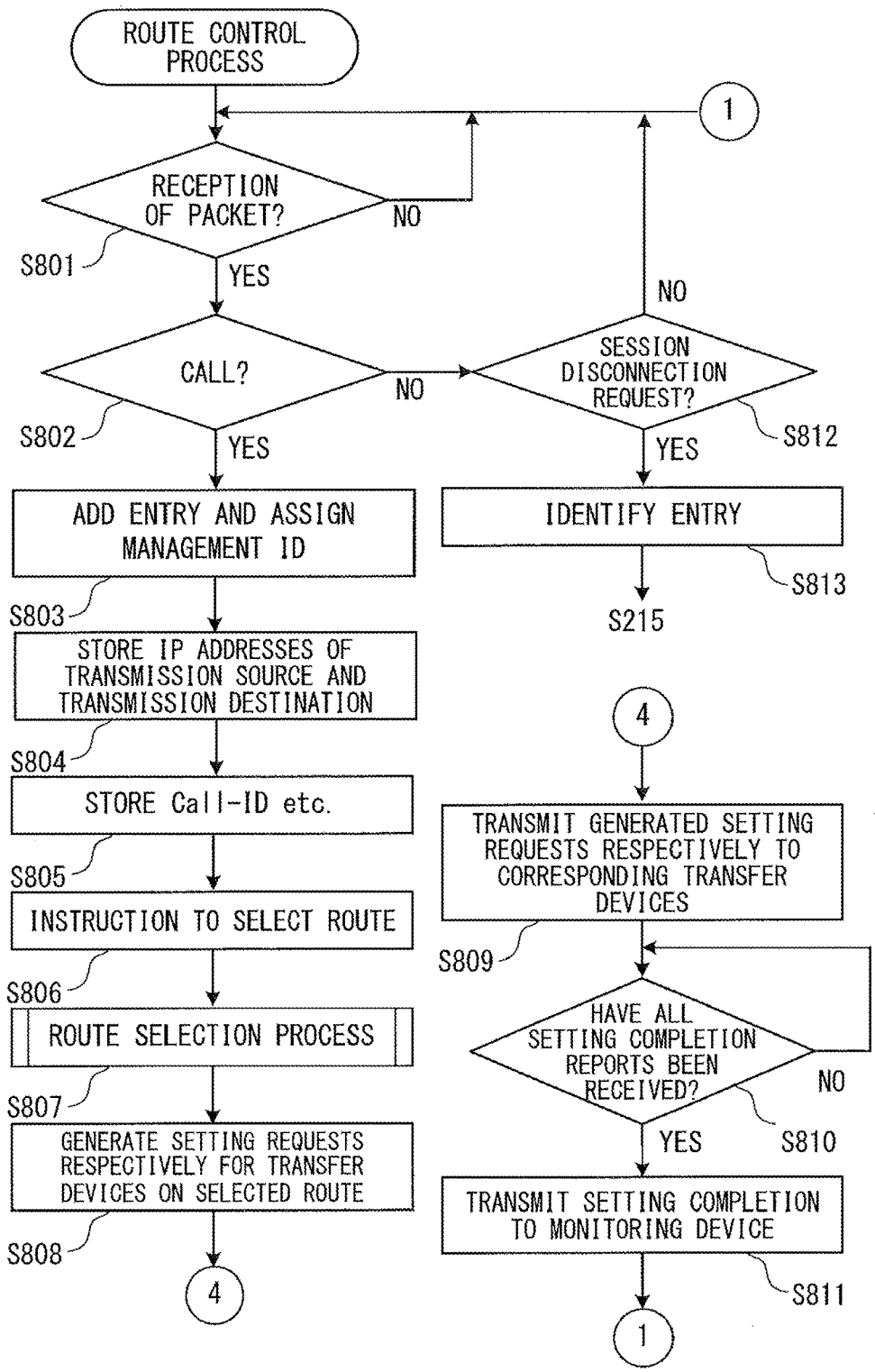
FIG. 35 illustrates a portion of an example of a flowchart for explaining the flow of a route control process in embodiment 2.

Next, with references to FIG. 35, explanations will be given for the flow of a route control process in embodiment 2 of the present invention. FIG. 35 illustrates a portion of an example of a flowchart for explaining the flow of a route control process in embodiment 2 of the present invention. A route control process according to the present invention is executed by the route control device 10 and is triggered by the reception of a copy packet that is transmitted by the monitoring device 20. Note that this process in embodiment 2 of the present invention is explained based on an assumption that a copy packet transmitted by the monitoring device 20 is a packet based on SIP.

The session management unit 13C determines whether an SIP-based packet transmitted from the monitoring device 20 has been received (step S801). When the session management unit 13C determines that an SIP-based packet has not been received (No in step S801), the process repeats the process in step S801, and waits for an SIP-based packet to be received.

When it is determined that an SIP-based packet has been received (Yes in step S801), the session management unit 13C further determines whether the received SIP-based packet is a packet of call (INVITE) (step S802). When it is determined that the received SIP-based packet is a packet of call (INVITE) (Yes in step S802), the session management unit 13C adds an entry to session management information INF5, and stores, in the "management ID" section of the added entry, the management ID assigned to a session that is to be newly established (step S803).

Then, the session management unit 13C stores, in the corresponding section of the added entry (step S804), the IP addresses of the transmission source and transmission destination in the packet header of the packet of call (INVITE). Also, the session management unit 13C stores, in the corresponding section of the corresponding entry in session management information INF5 (step S805), CALL-ID, the protocol, etc. included in call (INVITE). Then, the session management unit 13C instructs the route selection unit 13D to select a route (step S806).

Instructed to select a route, the route selection unit 13D executes a route selection process so as to select a route of a session that is to be newly established (step S807). Then, the route control unit 13E generates setting requests respectively for transfer devices SW on the selected route (step S809), and transmits the generated setting requests respectively to corresponding transfer devices SW (step S809).

Thereafter, the route control unit 13E determines whether setting completion reports have been received from all transfer devices SW to which setting requests were transmitted (step S810). When it is determined by the route control unit 13E that not all setting completion reports have been received (No in step S810), the process repeats the process in step S810, and waits for all setting completion reports to be received. When it is determined that all setting completion reports have been received (Yes in step S810), the route control unit 13E transmits setting completion to the monitoring device 20 (step S811). Then, the process returns to the process in step S801, and repeats the above process.

When it is determined in the process in step S802 that the received SIP-based packet is not a packet of call (INVITE) (No in step S802), the session management unit 13C further determines whether the received SIP-based packet is a packet of a session disconnection request (BYE) (step S812). When it is determined by the session management unit 13C that the received SIP-based packet is not a packet of a session disconnection request (BYE) (No in step S812), the process returns to step S801, and repeats the above process.

When it is determined that the received SIP-based packet is a packet of a session disconnection request (BYE) (Yes in step S812), the session management unit 13C identifies a corresponding entry in session management information INF5 on the basis of the session disconnection request (BYE) (step S813). Then, the process proceeds to the process in step S215, which was explained in embodiment 1. The subsequent processes are similar to those explained in embodiment 1.

Figure 36:
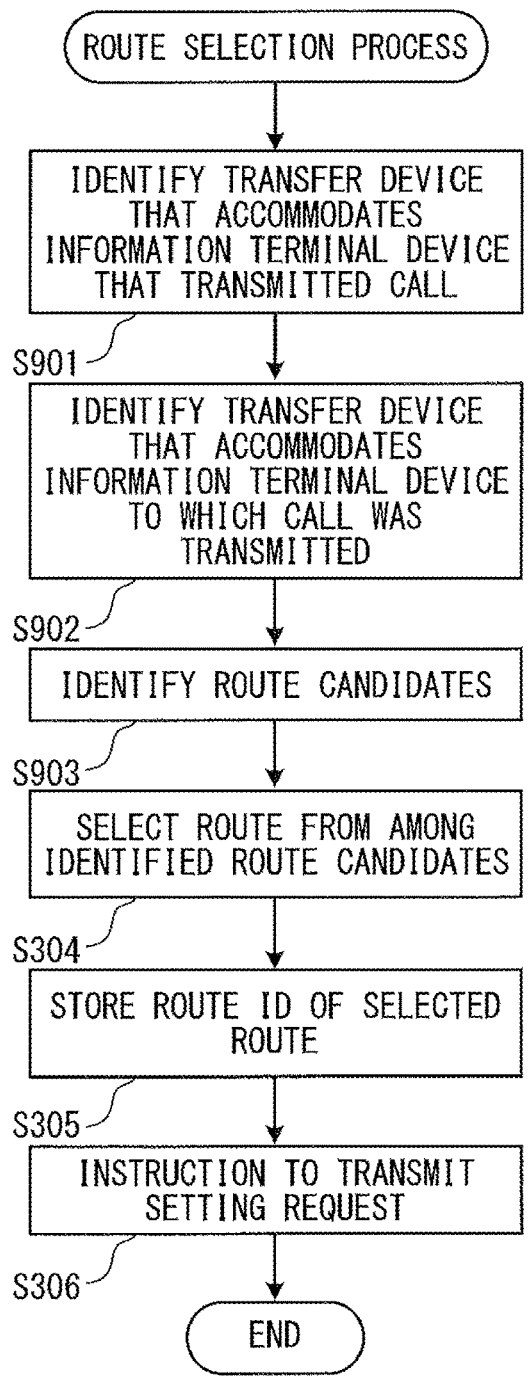
FIG. 36 illustrates an example of a flowchart for explaining the flow of the route selection process in embodiment 2.

Next, with references to FIG. 36, explanations will be given for the flow of a route selection process in embodiment 2 of the present invention. FIG. 36 illustrates an example of a flowchart for explaining the flow of a route selection process in embodiment 2 of the present invention. A route selection process according to the present invention is a process that corresponds to the process in step S807 described above. Note that the same processes as those in embodiment 1 are denoted by the same symbols.

The route selection unit 13D refers to first connection information INF1 so as to identify transfer device SW that accommodates first information terminal device T of a session that is to be newly established, i.e., transfer device SW accommodating information terminal device T that transmitted call (INVITE) (step S901). Also, the route selection unit 13D refers to first connection information INF1 so as to identify transfer device SW that accommodates second information terminal device T of a session that is to be newly established, i.e., transfer device SW accommodating information terminal device T to which call (INVITE) was transmitted (step S902). Thereafter, the route selection unit 13D identifies route candidates on the basis of identified transfer device SW in steps S901 and S902.

Then, the route selection unit 13D selects a route to be allocated for a session that is to be newly established from among the identified route candidates (step S304), and stores the route ID of the selected route in the "route ID" section of the corresponding entry in session management information INF5 (step S305). Then, the route selection unit 13D instructs the route control unit 13E to transmit a setting request. Then, this process is terminated, and the process proceeds to the process in step S808 of the route control process.

In embodiment 2 above, on the basis of an SIP-based packet instead of an RTSP-based packet, the route control device 10 detects that a session is to be newly established, selects a route of a session before the session is established, and establishes the selected route. Also, the route control device 10 cancels the setting of the route of the session on the basis of an SIP-based packet for disconnecting that session.

Figure 37:
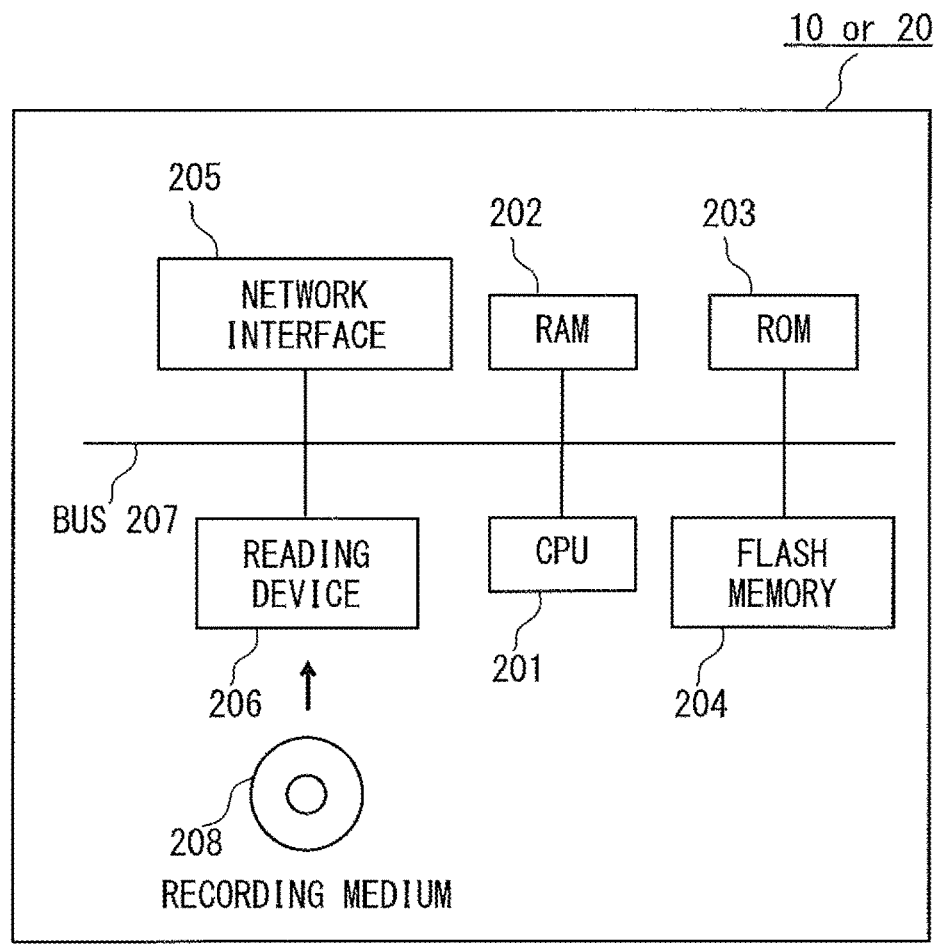
FIG. 37 illustrates an example of a hardware configuration of a route control device (or a monitoring device) in each embodiment.

FIG. 37 illustrates an example of a hardware configuration of the route control device 10 (or the monitoring device 20) in each embodiment. The route control device 10 (or the monitoring device 20) illustrated in FIG. 37 may be implemented by for example the various types of hardware illustrated in FIG. 37.

In the example illustrated in FIG. 37, the route control device 10 (or the monitoring device 20) includes a CPU 201, a RAM 202, a ROM 203, a flash memory 204, a network interface 205 for the connection with a network, and a reading device 206, and these pieces of hardware are connected via a bus 207.

The CPU 201 loads for example the operation program stored in the flash memory 204 onto the RAM 202, and executes various types of processes by using the RAM 202 as a working memory. The CPU 201 executes the operation program and implements the respective functional units in the control unit 13 illustrated in FIG. 8 (or the control unit 23 illustrated in FIG. 14).

The CPU 201 of the route control device 10 is an example of a processor or a first processor, and the CPU 201 of the monitoring device 20 is an example of a second processor.

Note that it is also possible to employ a configuration in which the operation program for executing the above process is recorded in a computer-readable recording medium 208 such as a flexible disk, a Compact Disk-Read Only Memory (CD-ROM), a Digital Versatile Disk (DVD), a Magneto Optical disk (MO), etc. so as to be distributed, the reading device 206 of the route control device 10 (or the monitoring device 20) reads and installs it in a computer, and thereby the above process is executed. It is also possible to employ a configuration in which the operation program has been recorded in a disk device etc. included in a server apparatus on the Internet and the operation program is taken in by a computer of the route control device 10 (or the monitoring device 20) by downloading the operation program or in other forms.

Note that depending upon embodiments, a recording device of a type that is different from the types of the RAM 202, the ROM 203 or the flash memory 204 may also be used. For example, the route control device 10 (or the monitoring device 20) may include a recording device such as a Content Addressable Memory (CAM), a Static Random Access Memory (SRAM), a Synchronous Dynamic Random Access Memory (SDRAM), etc.

Note that depending upon embodiments, the hardware configuration of the route control device 10 (or the monitoring device 20) may be different from that illustrated in FIG. 37, and a piece of hardware of a type that is different from the standards/types exemplified in FIG. 37 may be applied to the route control device 10 (or the monitoring device 20).

For example, the respective functional units of the control unit 13 of the route control device 10 exemplified in FIG. 8 (or the control unit 23 of the monitoring device 20 illustrated in FIG. 14) may be implemented by a hardware circuit. Specifically, the respective functional units of the control unit 13 illustrated in FIG. 8 (or the control unit 23 illustrated in FIG. 14) may be implemented by a reconfigurable circuit such as a Field Programmable Gate Array (FPGA) etc., by an Application Specific Integrated Circuit (ASIC), or by other circuits. Naturally, these functional units may be implemented by both the CPU 201 and a hardware circuit.

FIG. 38 illustrates an example of a hardware configuration of transfer device SW in each embodiment. Transfer device SW illustrated in FIG. 38 may be implemented by for example various types of hardware illustrated in FIG. 38. In the example illustrated in FIG. 38, transfer device SW includes a CPU 301, a RAM 302, a ROM 303, a flash memory 304, a network interface 305 for the connection with a network, and a packet transfer device 306 that transfers a packet, and these pieces of hardware are connected via a bus 307.

The CPU 301 loads for example the operation program stored in the flash memory 304 onto the RAM 302, and executes the various types of processes by using the RAM 302 as a working memory. The CPU 301 may implement the respective functional units in the control unit 33 illustrated in FIG. 16 by executing the operation program.

Note that it is also possible to employ a configuration in which the operation program for executing the above process is recorded in a computer-readable recording medium such as a flexible disk, a Compact Disk-Read Only Memory (CD-ROM), a Digital Versatile Disk (DVD), a Magneto Optical disk (MO), etc. so as to be distributed, a reading device (not illustrated) of transfer device SW reads and installs it on a computer, and the above process is executed. Further, it is also possible to employ a configuration in which the operation program has been recorded in a disk device etc. included in a server apparatus on the Internet and the operation program is taken in by a computer of transfer device SW by downloading the operation program or by other forms.

Note that depending upon embodiments, a recording device of a type that is different from the types of the RAM 302, the ROM 303 or the flash memory 304 may also be used. For example, transfer device SW may include a recording device such as a Content Addressable Memory (CAM), a Static Random Access Memory (SRAM), a Synchronous Dynamic Random Access Memory (SDRAM), etc.

Note that depending upon embodiments, the hardware configuration of transfer device SW may be different from that illustrated in FIG. 38, and a piece of hardware of a type that is different from the standards/types exemplified in FIG. 38 may be applied to transfer device SW.

For example, the respective functional units of the control unit 33 of transfer device SW illustrated in FIG. 16 may be implemented by a hardware circuit. Specifically, the respective functional units of the control unit 33 illustrated in FIG. 16 may be implemented by a reconfigurable circuit such as a Field Programmable Gate Array (FPGA) etc., by an Application Specific Integrated Circuit (ASIC), or by other circuits. Naturally, these functional units may be implemented by both the CPU 301 and a hardware circuit.

Therefore, the embodiments make it possible to improve the quality of a session that is newly established while suppressing influence on a session that has already been established.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A route control device configured to control a transfer destination in a plurality of transfer devices that are included in a network and that transfer packets flowing between a first information processing device and a second information processing device, the route control device comprising
a processor that:
detects that a session is to be newly established, on the basis of a copy of a packet of a protocol that controls a session transmitted prior to establishment of a session between the first information processing device and the second information processing device, the packet of the protocol being a packet that has been transferred between the first information processing device and the second information processing device;
selects a route with a light load from among a plurality of routes connecting the first information processing device and the second information processing device; and
makes a transfer device on a selected route establish a selected route.

2. The route control device according to claim 1, wherein the processor:
selects a route with a light load from among the plurality of routes before the session is established, and
makes a transfer device on a selected route establish a selected route before the session is established.

3. The route control device according to claim 1, wherein the processor selects a route with the load that is lightest.

4. The route control device according to claim 3, wherein the processor selects, when there are a plurality of routes with the load that is lightest, a route with a lower hop count from among the routes with the load that is the lightest.

5. The route control device according to claim 1, wherein the processor:

identifies a session that is a disconnection target on the basis of a packet that controls disconnection of the session, and makes a transfer device cancel a route, the transfer device being on the route corresponding to the session that is a disconnection target.

6. The route control device according to claim 1, wherein the processor manages information on a session that is being established.

7. The route control device according to claim 6, wherein the processor identifies a piece of the information corresponding to a session that is a disconnection target from among pieces of the information on a session that is being established, on the basis of a packet that controls disconnection of the session, and deletes the identified information.

8. The route control device according to claim 1, wherein the protocol is Real Time Streaming Protocol (RTSP).

9. The route control device according to claim 1, wherein the protocol is Session Initiation Protocol (SIP).

10. A system comprising:

a plurality of transfer devices configured to transfer packets flowing between a first information processing device and a second information processing device;

a route control device configured to control a transmission destination in the plurality of transfer devices; and a monitoring device configured to monitor the packets flowing between the first information processing device and the second information processing device, wherein the route control device includes a first processor that:
    detects that a session is to be newly established, on the basis of a copy of a packet of a protocol that controls a session transmitted prior to establishment of a session between the first information processing device and the second information processing device,
    selects a route with a light load from among a plurality of routes connecting the first information processing device and the second information processing device; and
    instructs a transfer device on a selected route to establish the selected route, each of the plurality of transfer devices establishes a route in accordance with an instruction of establishment, and the monitoring device includes a second processor that:
    monitors a protocol of each of the packets;
    extracts, on the basis of a result of the monitoring of the protocol, a packet of a protocol that controls the session from among the packets;
    transmits a copy of the extracted packet to the route control device,
    extracts, from among the packets and on the basis of the result of the monitoring of the protocol, a particular packet of a protocol that functions as a trigger for starting packet transmission in the session to be newly established;
    temporarily holds the extracted particular packet; and
    transmits the temporarily held packet to an inherent transmission destination after the selected route is established.

11. The system according to claim 10, wherein the first processor:

identifies a session that is a disconnection target on the basis of a packet that controls disconnection of the session, and instructs a transfer device on a route corresponding to the session that is a disconnection target to disconnect the route, wherein each of the plurality of transfer devices cancels a route that is established, in accordance with an instruction of cancellation.

12. The system according to claim 10, wherein the system is a video delivery system, the protocol is real time streaming protocol (RTSP), and the particular packet is a packet of a reproduction start request.

13. A route control method for a route control device configured to control a transfer destination in a plurality of transfer devices that are included in a network and that transfer packets flowing between a first information processing device and a second information processing device, the route control method comprising:

detecting that a session is to be newly established, on the basis of a copy of a packet of a protocol that controls a session transmitted prior to establishment of a session between the first information processing device and the second information processing device, the packet of the protocol being a packet that has been transferred between the first information processing device and the second information processing device;

selecting a route with a light load from among a plurality of routes connecting the first information processing device and the second information processing device; and making a transfer device on a selected route establish a selected route.

14. A non-transitory computer-readable recording medium having stored therein a program for causing a computer to execute a process, the computer being of a route control device configured to control a transfer destination in a plurality of transfer devices that constitute a network and that transfer packets flowing between a first information processing device and a second information processing device and the process comprising:

detecting that a session is to be newly established, on the basis of a copy of a packet of a protocol that controls a session transmitted prior to establishment of a session between the first information processing device and the second information processing device, the packet of the protocol being a packet that has been transferred between the first information processing device and the second information processing device;

selecting a route with a light load from among a plurality of routes connecting the first information processing device and the second information processing device; and making a transfer device on a selected route establish a selected route.

* * * * *